United States Patent
Ramasubramonian et al.

(10) Patent No.: US 11,363,284 B2
(45) Date of Patent: Jun. 14, 2022

(54) UPSAMPLING IN AFFINE LINEAR WEIGHTED INTRA PREDICTION

(71) Applicant: QUALCOMM Incorporated, San Diego, CA (US)

(72) Inventors: Adarsh Krishnan Ramasubramonian, Irvine, CA (US); Geert Van der Auwera, Del Mar, CA (US); Luong Pham Van, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/868,982

(22) Filed: May 7, 2020

(65) Prior Publication Data

US 2020/0359037 A1    Nov. 12, 2020

Related U.S. Application Data

(60) Provisional application No. 62/845,839, filed on May 9, 2019.

(51) Int. Cl.
*H04N 19/176*    (2014.01)
*H04N 19/159*    (2014.01)
(Continued)

(52) U.S. Cl.
CPC .......... *H04N 19/44* (2014.11); *H04N 19/105* (2014.11); *H04N 19/117* (2014.11);
(Continued)

(58) Field of Classification Search
CPC ............................ H04N 19/44; H04N 19/105
See application file for complete search history.

(56) References Cited

U.S. PATENT DOCUMENTS

| | | | |
|---|---|---|---|
| 2013/0251036 A1* | 9/2013 | Lee ...................... | H04N 19/117 375/240.12 |
| 2014/0185672 A1* | 7/2014 | Terada .................. | H04N 19/11 375/240.12 |

(Continued)

OTHER PUBLICATIONS

Bossen F., et al., "Non-CE3: A Unified Luma Intra Mode list Construction Process," Joint Video Experts Team (JVET) of ITU-T SG 16 WP 3 and ISO/IEC JTC 1/SC 29/WG 11, Document: JVET-M0528-r1, 13th Meeting: Marrakech, MA, Jan. 9-18, 2019, pp. 1-4.

(Continued)

*Primary Examiner* — Irfan Habib
(74) *Attorney, Agent, or Firm* — Shumaker & Sieffert, P.A.

(57) ABSTRACT

A device for decoding video data determine that a current block of video data is encoded in an affine linear weighted intra prediction (ALWIP) mode; derives, based on a set of left edge neighboring samples of the current block and a set of top edge neighboring samples of the current block, a subset of left edge samples and a subset of top edge samples; applies an affine model to the subset of left edge samples and the subset of top edge samples to generate an intermediate block of intermediate samples; filters the intermediate samples to generate a final prediction block; decodes the current block of video data based on the final prediction block.

45 Claims, 24 Drawing Sheets

(51) Int. Cl.
H04N 19/117 (2014.01)
H04N 19/44 (2014.01)
H04N 19/105 (2014.01)
H04N 19/132 (2014.01)

(52) U.S. Cl.
CPC ......... H04N 19/132 (2014.11); H04N 19/159 (2014.11); H04N 19/176 (2014.11)

(56) References Cited

U.S. PATENT DOCUMENTS

| | | | | |
|---|---|---|---|---|
| 2015/0288980 | A1* | 10/2015 | Lee | H04N 19/51 375/240.16 |
| 2019/0082191 | A1 | 3/2019 | Chuang et al. | |
| 2019/0273926 | A1* | 9/2019 | Heo | H04N 19/11 |
| 2019/0306513 | A1 | 10/2019 | Van Der Auwera et al. | |
| 2020/0068223 | A1 | 2/2020 | Rusanovskyy | |
| 2020/0322601 | A1* | 10/2020 | Ko | H04N 19/70 |
| 2020/0322620 | A1* | 10/2020 | Zhao | H04N 19/176 |
| 2020/0322623 | A1* | 10/2020 | Chiang | H04N 19/543 |
| 2020/0344468 | A1* | 10/2020 | Lin | H04N 19/593 |
| 2020/0396459 | A1* | 12/2020 | Lin | G06F 17/16 |
| 2021/0051333 | A1* | 2/2021 | Zhao | H04N 19/176 |
| 2021/0084308 | A1* | 3/2021 | Yasugi | H04N 19/59 |
| 2021/0120240 | A1* | 4/2021 | Bross | H04N 19/159 |
| 2021/0160515 | A1 | 5/2021 | Huo et al. | |

OTHER PUBLICATIONS

Bross B., et al., "Versatile Video Coding (Draft 23)," JVET-L1001-V1, Joint Video Experts Team (JVET) of ITU-T SG 16 WP 3 and ISO/IEC JTC 1/SC 29/WG 11, 12th Meeting: Macao, CN, Oct. 3-12, 2018, 165 Pages.
Bross B., et al., "Versatile Video Coding (Draft 5)," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1001-v7, 386 Pages.
Bross B., et al., "Versatile Video Coding (Draft 5)," Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-v3, 371 pages.
Bross B., et al., "Versatile Video Coding (Draft 8)," Joint Video Experts Team (JVET) of ITU-T SG 16 WP 3 and ISO/IEC JTC 1/SC 29/WG 11, 17th Meeting: Brussels, BE, Jan. 7-17, 2020, Document: JVET-Q2001-vE, 515 Pages.
Chen J., et al., "Algorithm description for Versatile Video Coding and Test Model 2 (VTM 2)," Joint Video Experts Team (JVET) of ITU-T SG 16 WP 3 and ISO/IEC JTC 1/SC 29/WG 11, JVET-K1002-v2, 11th Meeting: Ljubljana, SI, Jul. 10-18, 2018, pp. 1-21.
Chen J., et al., "Algorithm description for Versatile Video Coding and Test Model 3 (VTM 3)," Joint Video Experts Team (JVET) of ITU-T SG 16 WP 3 and ISO/IEC JTC 1/SC 29/WG 11, JVET-L1002-v2, 12th Meeting: Macao, CN, Oct. 3-12, 2018, Doc: JVET-L1002, 48 pages.
Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16 ); URL: http://phenix.int-evry.fr/jvet/ ,, No. JVET-A1001 Feb. 24, 2016 (Feb. 24, 2016), XP030150000, 27 pages.
Chen J., et al., "Algorithm description of Joint Exploration Test Model 3," 3rd JVET Meeting; May 26, 2016-Jun. 1, 2016; Geneva; (The Joint Video Exploration Team Of ISO/IEC JTC1/SC29/WG11 and ITU-T SG.16); URL: http://phenix.int-evry.fr/jvet/, No. JVET-C1001)v1, Jul. 2, 2016 (Jul. 2, 2016), XP030150223, 38 Pages.
Choi J., et al., "Non-CE3: Simplified Mode mapping in MIP," 15. JVET Meeting; Jul. 3, 2019-Jul. 12, 2019; Gothenburg; (The Joint Video Exploration Team of ISO/IEC JTC1/SC29/WG11 and ITU-TSG.16), No. JVET-o0396, Jul. 3, 2019 (Jul. 3, 2019), XP030219452, 6 pages, Retrieved from the Internet: URL: http://phenix.int-evry. fr/jvet/doc-end_user/documents/15_Gothenburg/wg11/JVET-O0396-v2.zip JVET-00396 v2.docx [retrieved on Jul. 3, 2019],section 2.
Christos G., et al., "Beyond the High Efficiency Video Coding Standard: An Overview," Proceedings of SPIE; [Proceedings of SPIE ISSN 0277-786X vol. 10524], SPIE, US, vol. 10223, May 1, 2017 (May 1, 2017), pp. 102230F-1-102230F-18, XP060089254, DOI: 10.1117/12.2261109, ISBN: 978-1-5106-1533-5.
Fan K., et al., "Improved Intra Boundary Filters for HEVC," VCIP 2017, Dec. 10-13, 2017, St Petersburg, USA, XP33325783, 4 Pages.
Helle P., et al., "Variations of the 8-bit Implementation of MIP," Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0481-v3, pp.1-8.
Hernandez S., et al., "CE3: Intra Sub-Partitions Coding Mode (Tests 1.1.1 and 1.1.2)," Joint Video Experts Team (JVET) of ITU-T SG 16 WP 3 and ISO/IEC JTC 1/SC 29/WG 11, Document: JVET-M0102-V5, 13th Meeting: Marrakech, MA, Jan. 9-18, 2019, pp. 1-9.
Hernández S-D., et al., "CE3: Line-based intra coding mode (Tests 2.1.1 and 2.1.2)," 12th JVET Meeting, Oct. 3, 2018-Oct. 12, 2018, Macao, CN, (The Joint Video Exploration Team Of ISO/IEC JTC1/SC29/WG11 and ITU-T SG.16), No. JVET-L0076-V2, Fraunhofer HHI, pp. 1-10.
"Information technology—Dynamic Adaptive Streaming over HTTP {DASH)—Part 1: Media Presentation Description and Segment Formats," ISO/IEC 23009-1, International Standard, Draft third edition, Jan. 9, 2017, 216 pp.
International Search Report and Written Opinion—PCT/US2020/032048—ISA/EPO—dated Jul. 14, 2020 14 Pages.
ITU-T H.265, Series H: Audiovisual and Multimedia Systems, Infastructure of Audiovisual Services—Coding of Moving Video, High Efficiency Video Coding, The International Telecommunication Union, Jun. 2019, 696 Pages.
JVET: "VTM-5.0, Tags, JVET/VVCSoftware_VTM, GitLab," Frank Bossen, https://vcgit.hhi.fraunhofer.de/jvet/VVCSoftware_VTM/-/tags/VTM-5.0, Accessed Jul. 2019, pp. 1-3.
Kondo K., et al., "Non-CE3: On Adaptive Rounding Offset of MIP," Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0407-v2, pp. 1-4.
Pfaff J., et al., "CE3: Affine Linear Weighted Intra Prediction (CE3-4.1, CE3-4.2)," 14. JVET Meeting; Mar. 19, 2019-Mar. 27, 2019, Geneva; (The Joint Video Exploration Team of ISO/IEC JTC1/SC29/WG11 and ITU-T SG.16), No. JVET-N0217, Mar. 12, 2019 (Mar. 12, 2019), XP030202699, 17 pages, Retrieved from the Internet: URL: http://phenix.int-evry.fr/jvet/doc_end_user/documents/14_Geneva/wg11/JVET-N0217-v1.zip JVET-N0217_v1.docx [retrieved on Mar. 12, 2019] cited in the application, sections 1.1-1.10.
Pfaff J., et al., "Non-CE3: Harmonization of 8-Bit MIP with Unified-MPM and LFNST," Joint Video Experts Team (JVET) of ITU-T SG 16 WP 3 and ISO/IEC JTC 1/SC 29/WG 11, JVET-O0485-V2, 15th Meeting: Gothenburg, SE, Jul. 3-12, 2019, Document: JVET-O0485-r2, pp. 1-4.
Pfaff J., et al., "Non-CE3: Simplifications of MIP," Joint Video Experts Team (JVET) of ITU-T SG 16 WP 3 and ISO/IEC JTC 1/SC 29/WG 11, JVET-O0925-v3, 15th Meeting: Gothenburg, SE, Jul. 3-12, 2019, Document: JVET-O0925-r3, pp. 1-4.
Ramasubramonian A K., et al., "Non-CE3: MIP Simplifications," 15. JVET Meeting, Jul. 3, 2019-Jul. 12, 2019, Gothenburg; (The Joint Video Exploration Team of ISO/IEC JTC1/SC29/WG11 and ITU-TSG.16), No. JVET-O0187, Jul. 4, 2019 (Jul. 4, 2019), XP030218788, 6 pages, Retrieved from the Internet: URL: http://phenix.int-evry.fr/ivet/doc_end_user/documents/15_Gothenburg/wg11/JVET-O0187-v3.zip JVET-00187-v3.docx [retrieved on Jul. 4, 2019], section 2.
Salehifar M., et al., "CE3 Related: No MPM Derivation for Matrix Based Intra Prediction (MIP)," Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0169-V2, pp. 1-4.
Sullivan G.J., et al., "Overview of the High Efficiency Video Coding (HEVC) Standard," IEEE Transactions on Circuits and Systems for Video Technology, IEEE Service Center, Piscataway, NJ, US, vol.

(56) References Cited

OTHER PUBLICATIONS

22, No. 12, Dec. 1, 2012, XP011487803, pp. 1649-1668, ISSN: 1051-8215, DOI: 10.1109/TCSVT.2012.2221191 the whole document.

Yao S., et al., "Non-CE3: Intra Prediction Information Coding," Joint Video Experts Team (JVET) of ITU-T SG 16 WP 3 and ISO/IEC JTC 1/SC 29/WG 11, Document: JVET-M0210-V3, 13th Meeting: Marrakech, MA, Jan. 9-18, 2019, JVET-M0210-r2, pp. 1-7.

Zhang Z., et al., "Non-CE3: MIP Low Resolution Clipping," Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0168-V2, pp. 1-7.

Zhang Z., et al., "Non-CE3: Sample Value Clipping on MIP Reduced Prediction," Joint Video Experts Team (JVET) of ITU-T SG 16 WP 3 and ISO/IEC JTC 1/SC 29/WG 11, JVET-O0160, 15th Meeting: Gothenburg, SE, Jul. 3-12, 2019, Document: JVET-O0160, pp. 1-7.

Zhang Z., et al., "Non-CE3: Simplification on MIP Boundary Sample Downsampling Process," Joint Video Experts Team (JVET) of ITU-T SG 16 WP 3 and ISO/IEC JTC 1/SC 29/WG 11, JVET-O0161, 15th Meeting: Gothenburg, SE, Jul. 3-12, 2019, Document: JVET-O0161, pp. 1-9.

Zhao L., et al., "CE3-related: Unification of Angular Intra Prediction for Square and Non-square Blocks," 12, JVET Meeting, Oct. 3, 2018-Oct. 12, 2018, Macao, (The Joint Video Exploration Team of ISO/IEC JTC1/SC29/WG11 and ITU-T SG.16 ), No. JVET-L0279, Oct. 6, 2018 (Oct. 6, 2018), XP030195082, pp. 1-10, Retrieved from the Internet: URL: http://phenix.int-evry.fr/jvet/doc_end_user/documents/12_Macao/wg11/JVET-L0279-v3.zip JVET-L0279-v1.docx [retrieved on Oct. 6, 2018] cited in the application the whole document.

Chen J., et al., "Algorithm Description of Joint Exploration Test Model 7 (JEM7)", 7. JVET Meeting, Jul. 13, 2017-Jul. 21, 2017, JVET-G1001-V1, Joint Video Exploration Team (JVET) of ITU-T SG 16 WP3 and ISO/IEC JTC 1/SC 29/WG 11, No. G1001_v1, JVET-G1001, 7th Meeting, Jul. 13, 2017-Jul. 21, 2017, Torino, IT, Aug. 19, 2017 (Aug. 19, 2017), XP030150980, 48 Pages, pp. i-iv, Retrieved from the Internet: URL: https://phenix.int-evry.fr/jvet/doc_end_user/documents/7_Torino/wg11/JVET-G1001-v1.zip JVET-G1001-v1.docx, [retrieved on Aug. 19, 2017].

\* cited by examiner

Table I

| predModeIntra | -10^ | -9 | -8 | -7 | -6^ | -5 | -4 | -3 | -2 | -1 | 2* | 3 | 4 | -14^ | -13 | -12^ | -11 |
|---|---|---|---|---|---|---|---|---|---|---|---|---|---|---|---|---|---|
| intraPredAngle | 128^ | 102 | 86 | 73 | 64^ | 57 | 51 | 45 | 39 | 35 | 32* | 29 | 26 | 512^ | 341 | 256^ | 171 |
| predModeIntra | 9 | 10 | 11 | 12^ | 13 | 14^ | 15 | 16^ | 17 | 18# | 19 | 20^ | 21 | 5 | 6 | 7 | 8^ |
| intraPredAngle | 14 | 12 | 10 | 8^ | 6 | 4^ | 3 | 2^ | 1 | 0# | -1 | -2^ | -3 | 23 | 20 | 18 | 16 |
| predModeIntra | 26 | 27 | 28^ | 29 | 30 | 31 | 32 | 33 | 34* | 35 | 36 | 37 | 38 | 22^ | 23 | 24^ | 25 |
| intraPredAngle | -12 | -14 | -16^ | -18 | -20 | -23 | -26 | -29 | -32* | -29 | -26 | -23 | -20 | -4^ | -6 | -8^ | -10 |
| predModeIntra | 43 | 44^ | 45 | 46^ | 47 | 48^ | 49 | 50# | 51 | 52^ | 53 | 54^ | 55 | 39 | 40 | 41 | 42 |
| intraPredAngle | -10 | -8^ | -6 | -4^ | -3 | -2^ | -1 | 0# | 1 | 2^ | 3 | 4^ | 6 | -18 | -16 | -14 | -12 |
| predModeIntra | 60^ | 61 | 62 | 63 | 64 | 65 | 66* | 67 | 68 | 69 | 70 | 71 | 72^ | 56^ | 57 | 58 | 59 |
| intraPredAngle | 16^ | 18 | 20 | 23 | 26 | 29 | 32* | 35 | 39 | 45 | 51 | 57 | 64^ | 8^ | 10 | 12 | 14 |
| predModeIntra | 77 | 78^ | 79 | 80^ | | | | | | | | | | 73 | 74 | 75 | 76^ |
| intraPredAngle | 171 | 256^ | 341 | 512^ | | | | | | | | | | 73 | 86 | 102 | 128^ |

FIG. 7B

UPSAMPLING IN AFFINE LINEAR WEIGHTED INTRA PREDICTION

This application claims the benefit of U.S. Provisional Patent Application 62/845,839 filed 9 May 2019, the entire content of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

This disclosure describes techniques that may improve intra prediction, including the derivation and signaling of modes for linear weighted intra prediction, which may also be referred to as matrix intra prediction or matrix weighted intra prediction or affine linear weighted intra prediction (ALWIP). More specifically, for a current block of video data that is encoded in an ALWIP mode, this disclosure describes technique for filtering boundary reference samples to generate a filtered prediction block. The filtered prediction block may improve the rate-distortion tradeoff for blocks coded in the ALWIP mode by generating more accurate prediction blocks.

According to one example, a method of decoding video data includes determining that a current block of video data is encoded in an affine linear weighted intra prediction (ALWIP) mode; deriving, based on a set of left edge neighboring samples of the current block and a set of top edge neighboring samples of the current block, a subset of left edge samples and a subset of top edge samples, wherein the subset of left edge samples includes fewer samples than the set of left edge samples and the subset of top edge samples includes fewer samples than the set of top edge samples; applying an affine model to the subset of left edge samples and the subset of top edge samples to generate an intermediate block of intermediate samples; filtering, using the set of left edge neighboring samples and the set of top edge neighboring samples of the current block, the intermediate samples to generate a final prediction block; and decoding the current block of video data based on the final prediction block.

According to another example, a device for decoding video data includes a memory configured to store video data and one or more processors implemented in circuitry and configured to determine that a current block of video data is encoded in an affine linear weighted intra prediction (ALWIP) mode; derive, based on a set of left edge neighboring samples of the current block and a set of top edge neighboring samples of the current block, a subset of left edge samples and a subset of top edge samples, wherein the subset of left edge samples includes fewer samples than the set of left edge samples and the subset of top edge samples includes fewer samples than the set of top edge samples; apply an affine model to the subset of left edge samples and the subset of top edge samples to generate an intermediate block of intermediate samples; filter, using the set of left edge neighboring samples and the set of top edge neighboring samples of the current block, the intermediate samples to generate a final prediction block; and decode the current block of video data based on the final prediction block.

According to another example, a computer-readable storage medium storing instructions that when executed by one or more processors cause the one or more processor to determine that a current block of video data is encoded in an affine linear weighted intra prediction (ALWIP) mode; derive, based on a set of left edge neighboring samples of the current block and a set of top edge neighboring samples of the current block, a subset of left edge samples and a subset of top edge samples, wherein the subset of left edge samples includes fewer samples than the set of left edge samples and the subset of top edge samples includes fewer samples than the set of top edge samples; apply an affine model to the subset of left edge samples and the subset of top edge samples to generate an intermediate block of intermediate samples; filter, using the set of left edge neighboring samples and the set of top edge neighboring samples of the current block, the intermediate samples to generate a final prediction block; and decode the current block of video data based on the final prediction block.

According to another example, an apparatus for decoding video data includes means for determining that a current block of video data is encoded in an affine linear weighted intra prediction (ALWIP) mode; means for deriving, based on a set of left edge neighboring samples of the current block and a set of top edge neighboring samples of the current block, a subset of left edge samples and a subset of top edge samples, wherein the subset of left edge samples includes fewer samples than the set of left edge samples and the subset of top edge samples includes fewer samples than the set of top edge samples; means for applying an affine model to the subset of left edge samples and the subset of top edge samples to generate an intermediate block of intermediate samples; means for filtering, using the set of left edge neighboring samples and the set of top edge neighboring samples of the current block, the intermediate samples to generate a final prediction block; and means for decoding the current block of video data based on the final prediction block.

The details of one or more examples are set forth in the accompanying drawings and the description below. Other features, objects, and advantages will be apparent from the description, drawings, and claims.

BRIEF DESCRIPTION OF DRAWINGS

FIG. 7B is a table illustrating the relationship between intra prediction mode and intra prediction angle.

DETAILED DESCRIPTION

Figure 1:
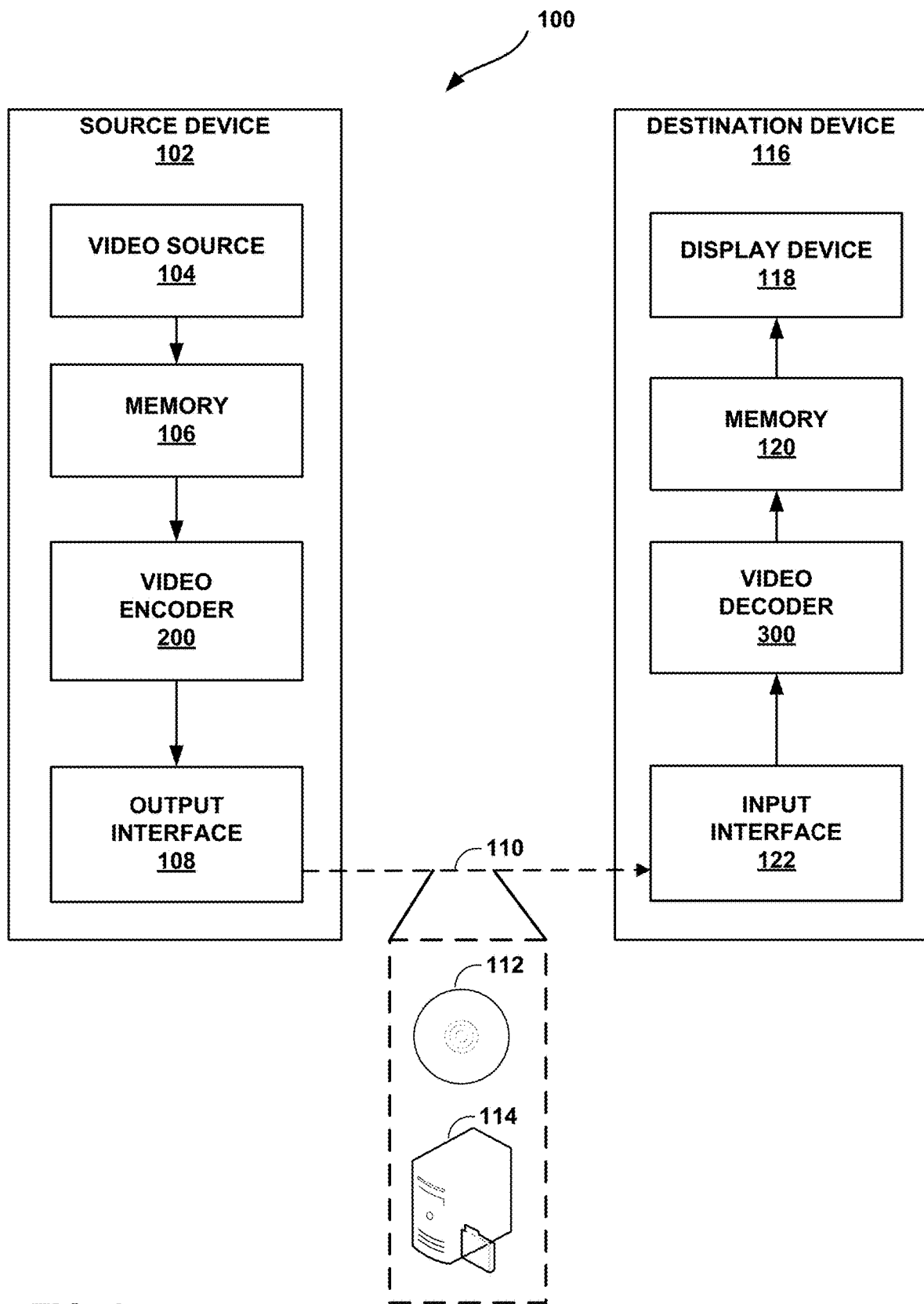
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the predictive block, also referred to as a prediction block, to the original block. Thus, the residual data represents a difference between the predictive block and the original block of video data, such that adding the residual data to the prediction block results in the original block of video. In some coding scenarios, to reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the predictive block to produce a reconstructed video block that matches the original video block more closely than the predictive block alone. Due to the loss introduced by the transforming and quantizing of the residual data, the reconstructed block may have distortion or artifacts. One common type of artifact or distortion is referred to as blockiness, where the boundaries of the blocks used to code the video data are visible.

To further improve the quality of decoded video, a video decoder may perform one or more filtering operations on the reconstructed video blocks. As part of performing one or more filtering operations, the video decoder may, for example, perform one or more of deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

This disclosure describes techniques that may improve intra prediction, including the derivation and signaling of modes for linear weighted intra prediction, which may also be referred to as matrix intra prediction or matrix weighted intra prediction or affine linear weighted intra prediction (ALWIP). More specifically, for a current block of video data that is encoded in an ALWIP mode, this disclosure describes technique for filtering boundary reference samples to generate a filtered prediction block. The filtered prediction block may improve the rate-distortion tradeoff for blocks coded in the ALWIP mode by generating more accurate prediction blocks.

As explained in more detail below, when a video coder codes a block in ALWIP mode, the video coder generates a set of "intermediate" predicted samples by multiplying a reduced number of boundary samples with a matrix and a bias vector. The video coder then upsamples the intermediate samples using linear interpolation to generate the predicted block. This process may result in prediction errors that end to be larger at the edges of the prediction blocks, resulting in larger residual values which require more bits to compress the video data. This disclosure describes techniques for filtering the intermediate samples to generate a final prediction block in a manner that may reduce the prediction errors in the prediction block. For example, a video coder configured according to the techniques of this disclosure may apply an affine model to a subset of left edge samples and a subset of top edge samples to generate an intermediate block of intermediate samples and then filter the intermediate samples by applying one or more filters in a vertical direction using a full set of left edge samples and a full set of top edge samples.

That is, the techniques of this disclosure may result in a video coder, when using ALWIP mode, generating a prediction block that more closely matches an original block of video data, and hence requires small residual values and thus fewer total bits to compress. By using fewer total bits compress blocks of video data coded in an ALWIP mode, the techniques of this disclosure may result in a video coder that achieves a better rate-distortion tradeoff.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Each of source device 102 and destination device 116 may comprise any of a wide range of devices, including a desktop computer, notebook (i.e., laptop) computer, mobile device, tablet computer, set-top box, a telephone handset such as a smartphone, television, camera, display device, digital media player, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for coding a block an ALWIP mode described herein. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform the techniques for coding a block an ALWIP mode described herein. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication standard or protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A recent draft of the VVC standard is described in Bross, et al. "Versatile Video Coding (Draft 8)," Joint Video Experts Team (JVET) of ITU-T SG 16 WP 3 and ISO/IEC JTC 1/SC 29/WG 11, 17$^{th}$ Meeting: Brussels, BE, 7-17 Jan. 2020, JVET-Q2001-v15 (hereinafter "VVC Draft 8"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video decoder 300 may be configured to determine that a current block of video data is encoded in an ALWIP mode; derive, based on a set of left edge neighboring samples of the current block and a set of top edge neighboring samples of the current block, a subset of left edge samples and a subset of top edge samples; apply an affine model to the subset of left edge samples and the subset of top edge samples to generate an intermediate block of intermediate samples; filter, using the set of left edge neighboring samples and the set of top edge neighboring samples of the current block, the intermediate samples to generate a final prediction block; and decode the current block of video data based on the final prediction block. Video encoder 200, as part of a decoding loop of a video encoding process, may likewise be configured to determine that a current block of video data is encoded in an ALWIP mode; derive, based on a set of left edge neighboring samples of the current block and a set of top edge neighboring samples of the current block, a subset of left edge samples and a subset of top edge samples; apply an affine model to the subset of left edge samples and the subset of top edge samples to generate an intermediate block of intermediate samples; filter, using the set of left edge neighboring samples and the set of top edge neighboring samples of the current block, the intermediate samples to generate a final prediction block; and decode the current block of video data based on the final prediction block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
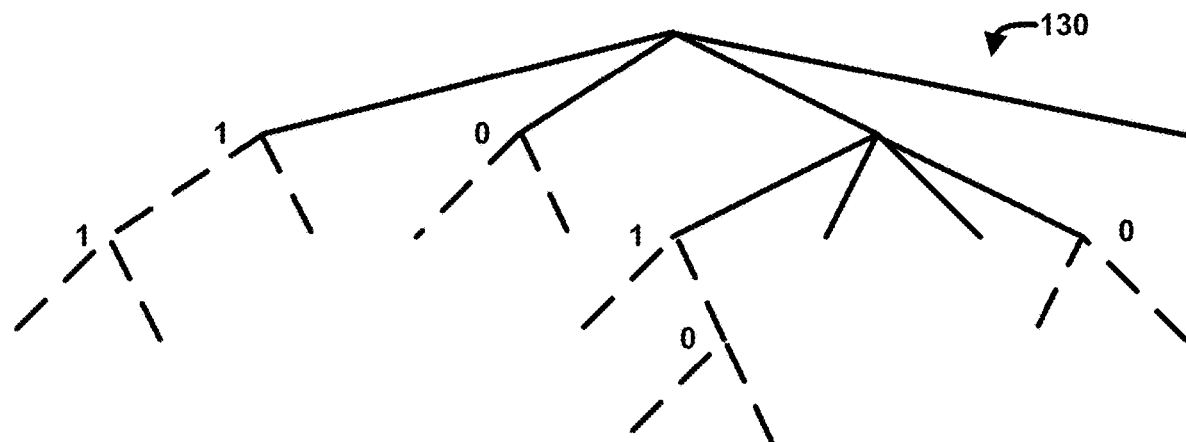
FIGS. 2A and 2B are conceptual diagrams illustrating an example quadtree binary tree (QTBT) structure, and a corresponding coding tree unit (CTU).
Figure 2B:
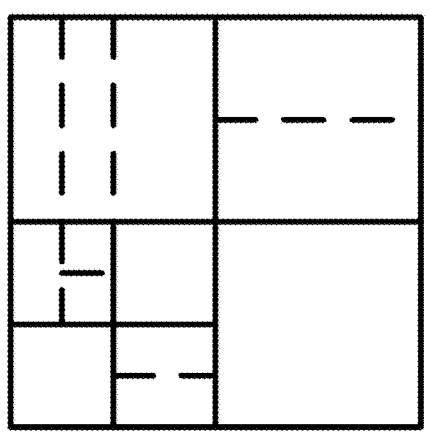

FIGS. 2A and 2B are conceptual diagram illustrating an example QTBT structure 130, and a corresponding CTU 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, then the node is not be further split by the binary tree, because the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having width equal to MinBTSize (4, in this example) implies no further horizontal splitting is permitted. Similarly, a binary tree node having a height equal to MinBTSize implies no further vertical splitting is permitted for that binary tree node. As noted above, leaf nodes of the binary tree are referred to as CUs and are further processed according to prediction and transform without further partitioning.

Figure 3:
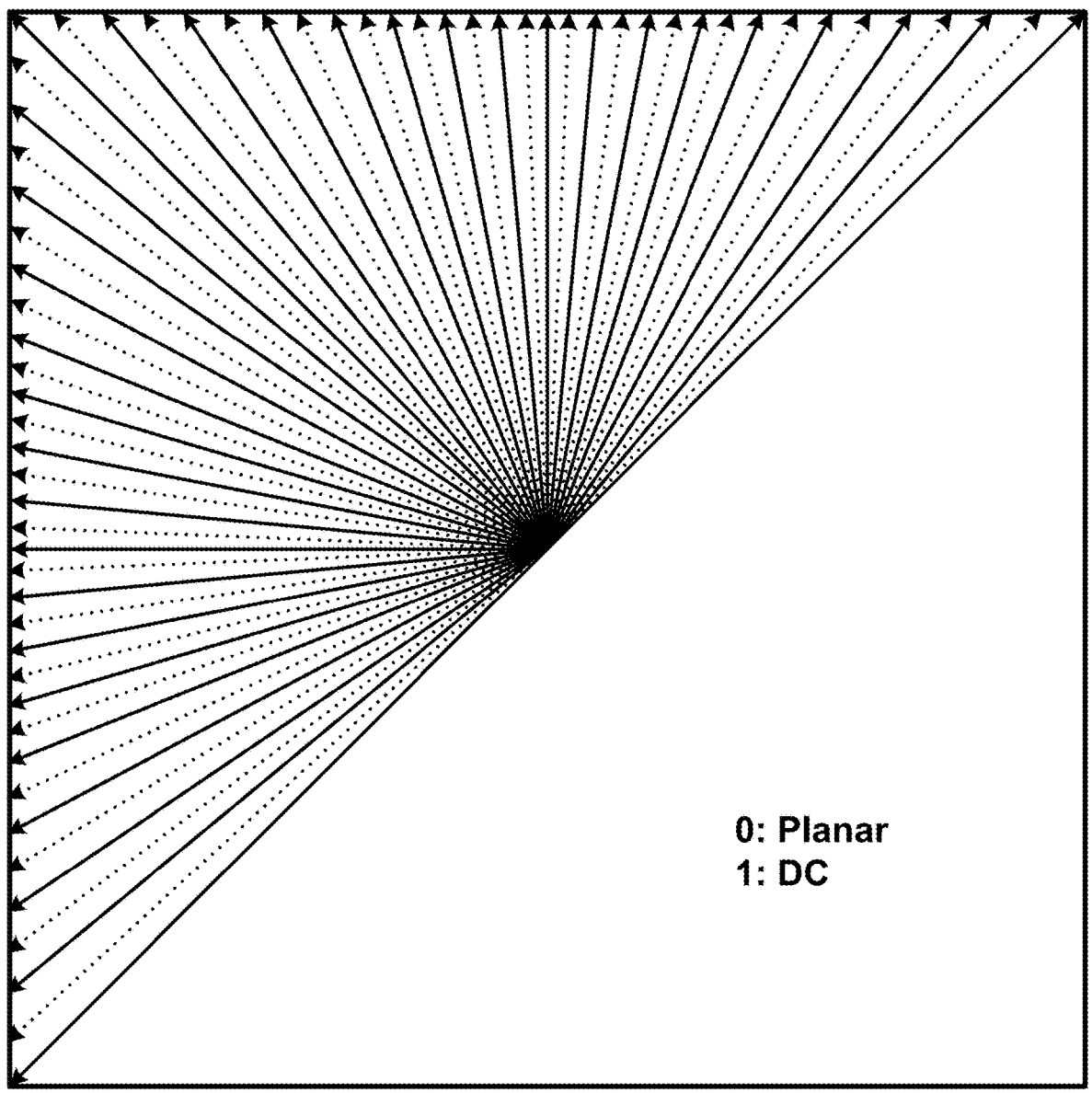
FIG. 3 shows examples of directions of intra prediction, where the arrows points towards the reference samples.

FIG. 3 shows examples of directions for intra prediction, with the arrows pointing towards the reference samples. Video encoder 200 and video decoder 300 may be configured to perform intra prediction, using both wide and non-wide angles. Intra prediction modes include DC prediction mode, Planar prediction mode, and directional (or angular) prediction modes. Directional prediction for square blocks uses directions between −135 degrees to 45 degrees of the current block in the VVC test model 2 (VTM2), J. Chen, Y. Ye, S. Kim, "Algorithm description for Versatile Video Coding and Test Model 2 (VTM2)," 11$^{th}$ JVET Meeting, Ljubljana, SI, July 2018 (JVET-K1002), as illustrated in FIG. 3.

In VTM2, the block structure used for specifying the prediction block for intra prediction is not restricted to be square (width w=height h). Rectangular or non-square prediction blocks (w>h or w<h) can increase the coding efficiency based on the characteristics of the content.

In such rectangular blocks, restricting the direction of intra prediction to be within −135 degrees to 45 degrees can result in situations where farther reference samples are used rather than closer reference samples for intra prediction. Such a design is likely to have an impact on the coding efficiency. It may be more beneficial to have the range of restrictions relaxed so that closer reference samples (beyond the −135 to 45-degree angle) can be used for prediction. An example of such a case is given in FIG. 4.

Figure 4:
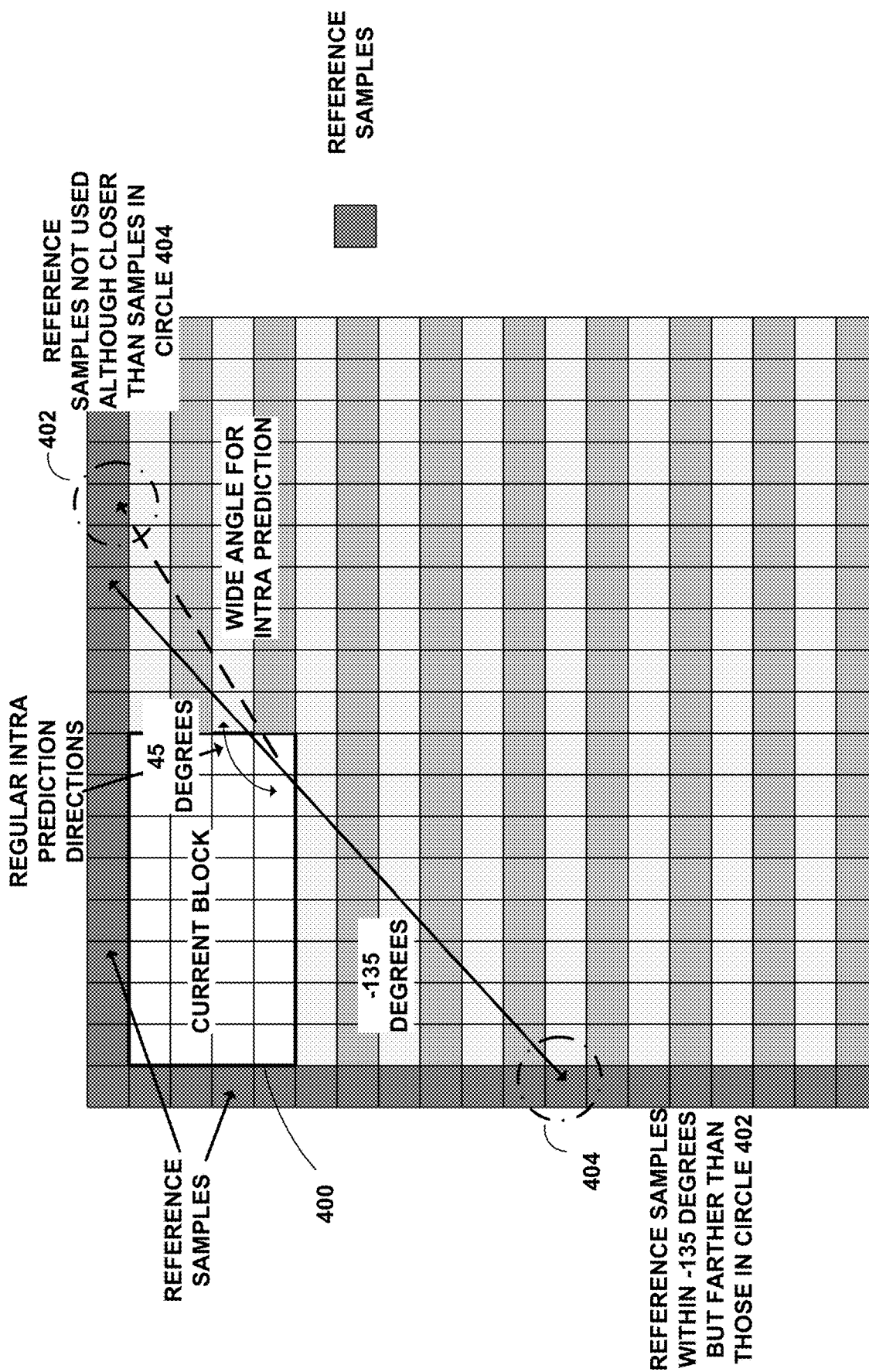
FIG. 4 shows an example of an 8×4 rectangular block where "closer" reference samples are not used for intra prediction, but farther reference samples may be used.

FIG. 4 shows an example of an 8×4 rectangular block (current block 400) where "closer" reference samples (circle 404) are not used for intra predicting current block 400. Instead, farther reference samples (circle 402) may be used, due to a restriction that the intra prediction direction must be in the range from −135 degrees to 45 degrees.

During the 12th JVET meeting, a modification of wide-angle intra prediction was proposed in L. Zhao, X. Zhao, S. Liu, X. Li, "CE3-related: Unification of angular intra prediction for square and non-square blocks," 12th JVET Meeting, Macau SAR, CN, October 2018, JVET-L0279 and was adopted into VTM3. VTM3 is described in J. Chen, Y. Ye, S. Kim, "Algorithm description for Versatile Video Coding and Test Model 3 (VTM3)," 12th JVET Meeting, Macau SAR, CN, October 2018, JVET-L1002.

Figure 5A:
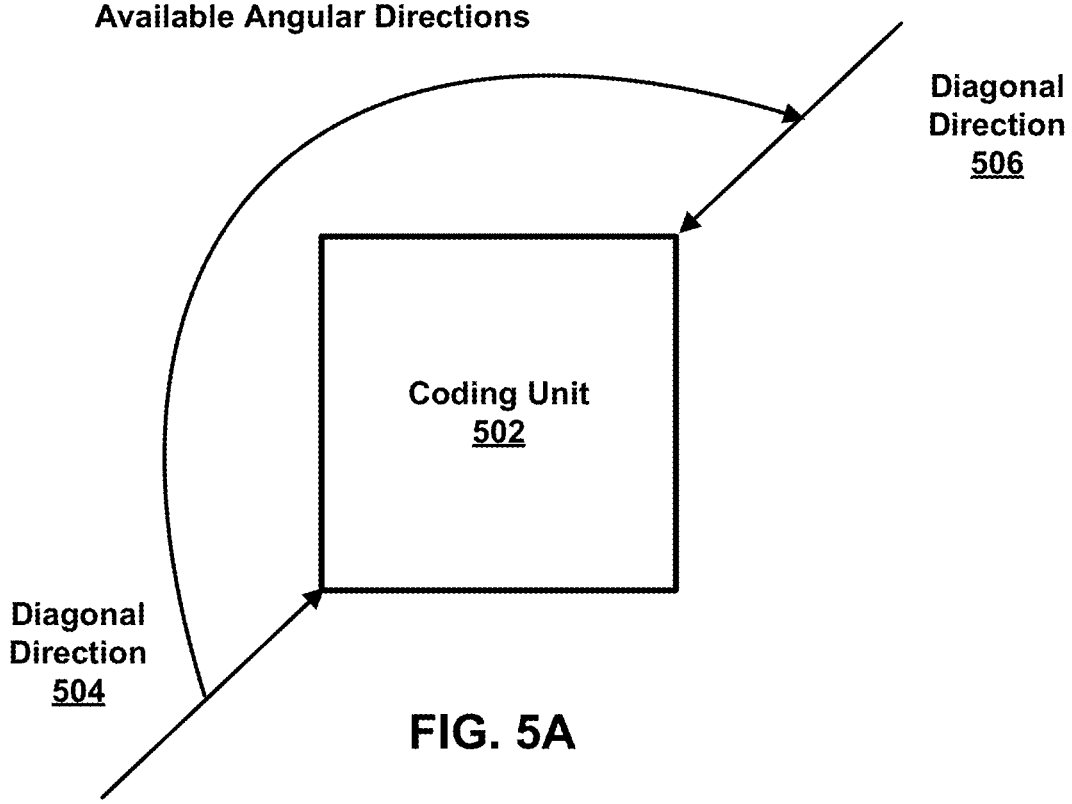
FIGS. 5A-5C show examples of mode mapping processes for modes outside the diagonal direction range.
Figure 5B:
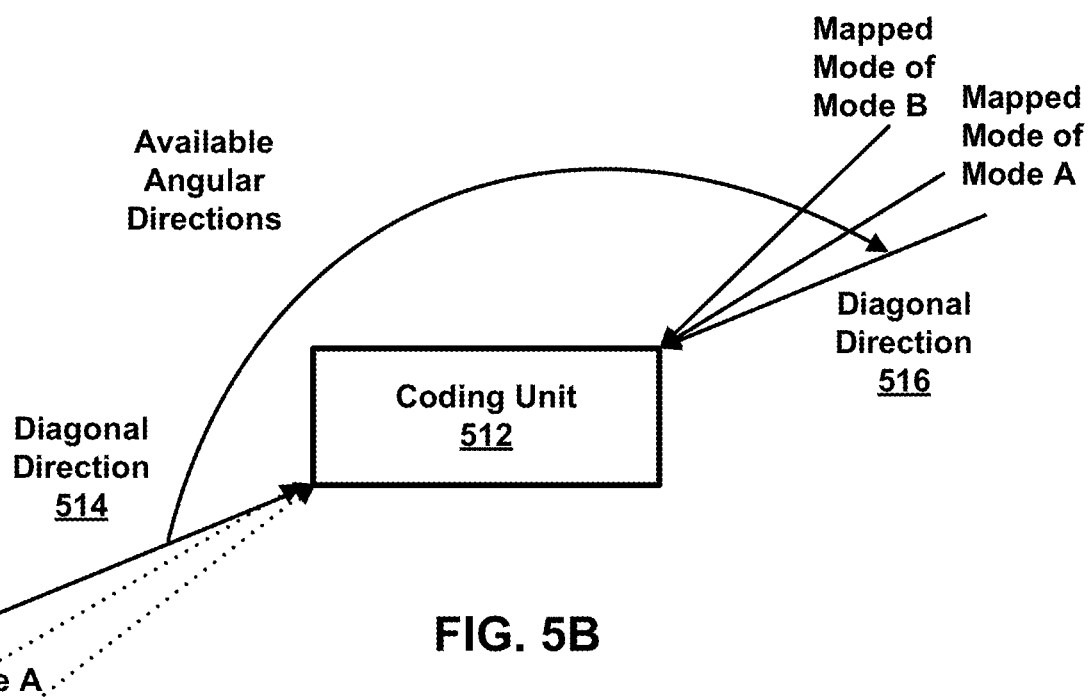
Figure 5C:
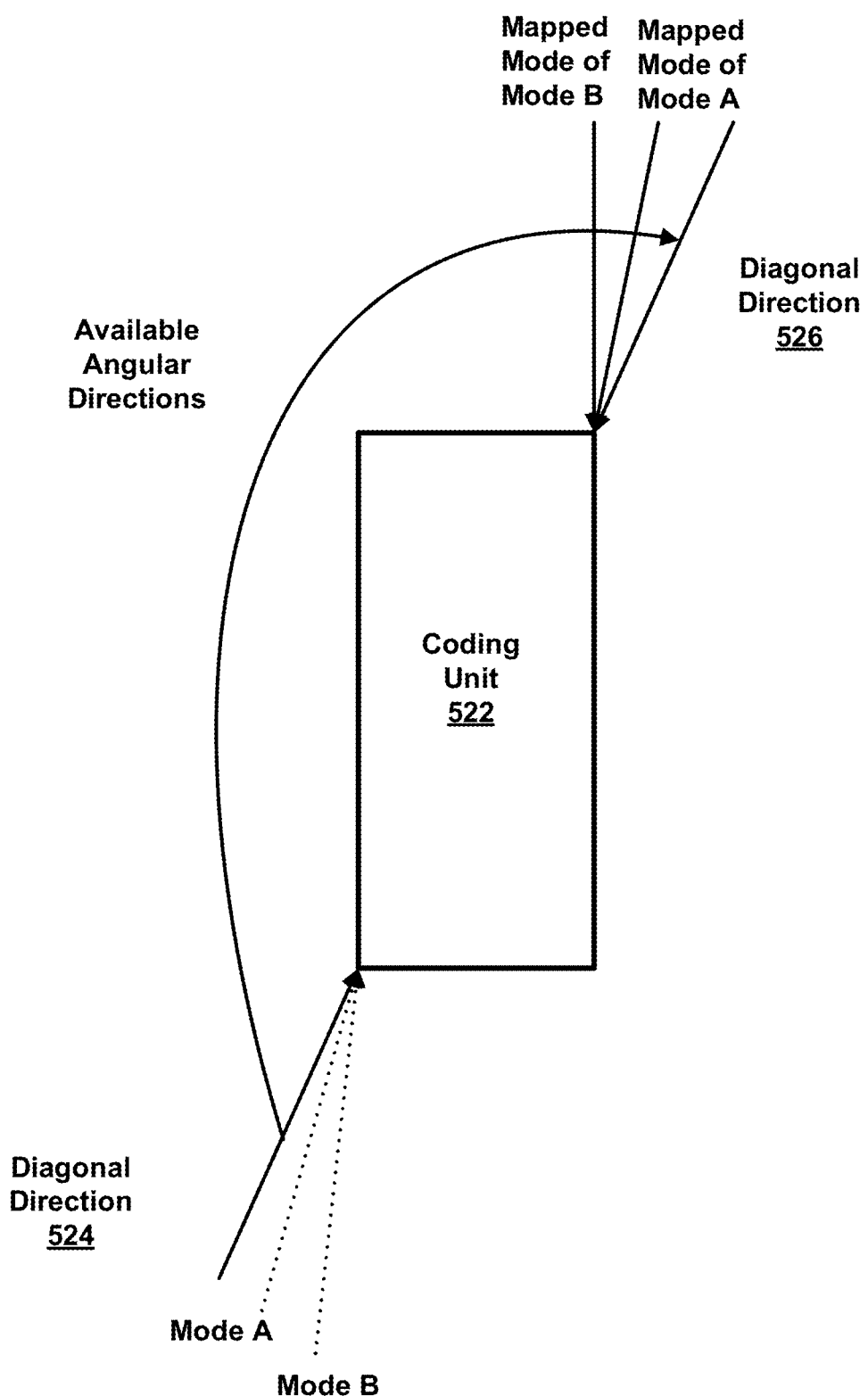

This proposal included two modifications to unify the angular intra prediction for square and non-square blocks. First, angular prediction directions were modified to cover diagonal directions of all block shapes. Secondly, all angular directions were kept within the range between the bottom-left diagonal direction and the top-right diagonal direction for all block aspect ratios (square and non-square) as illustrated in FIGS. 5A-5C. In addition, the number of reference samples in the top reference row and left reference column can be restricted to 2*width+1 and 2*height+1 for all block shapes.

FIGS. 5A-5C are conceptual diagram illustrating mode mapping for coding units with different shapes. Video encoder 200 and video decoder 300 may implement a mode mapping process to determine the available intra-prediction modes for various shapes and sized of CUs. FIG. 5A shows a square block that does not require angular mode remapping. FIG. 5B shows an angular mode remapping for a horizontal non-square block. FIG. 5C shows an angular mode remapping for a vertical non-square block. In FIGS. 5B and 5C, modes A and B are replaced by mapped modes A and B, such that there are still only 65 available angular modes, but those 65 available modes are different between FIG. 5A, FIG. 5B, and FIG. 5C.

In the example of FIG. 5A, CU 502 is a square block (i.e., w=h). Diagonal direction 504 corresponds to a 45 degree prediction angle, and diagonal direction 506 corresponds to a −135 degree prediction angle. All available prediction modes for CU 502 are between diagonal direction 504 and diagonal direction 506, and thus, no mode remapping is needed.

In the example of FIG. 5B, CU 512 is a non-square, rectangular block, where w is greater than h. Diagonal direction 514 represents the diagonal direction running from the bottom-left corner of CU 512 to the top-right corner of CU 512, and diagonal direction 516 represents the diagonal direction running from the top-right corner of CU 512 to the bottom-left corner of CU 512. As modes A and B are not between diagonal directions 514 and 516, modes A and B are replaced by mapped modes A and B, such that all available prediction modes for CU 512 are between diagonal direction 514 and diagonal direction 516.

In the example of FIG. 5C, CU 522 is a non-square, rectangular block, where h is greater than w. Diagonal direction 524 represents the diagonal direction running from the bottom-left corner of CU 522 to the top-right corner of CU 522, and diagonal direction 526 represents the diagonal direction running from the top-right corner of CU 522 to the bottom-left corner of CU 522. As modes A and B are not between diagonal directions 524 and 526, modes A and B are replaced by mapped modes A and B, such that all available prediction modes for CU 522 are between diagonal direction 624 and diagonal direction 526.

Figure 6:
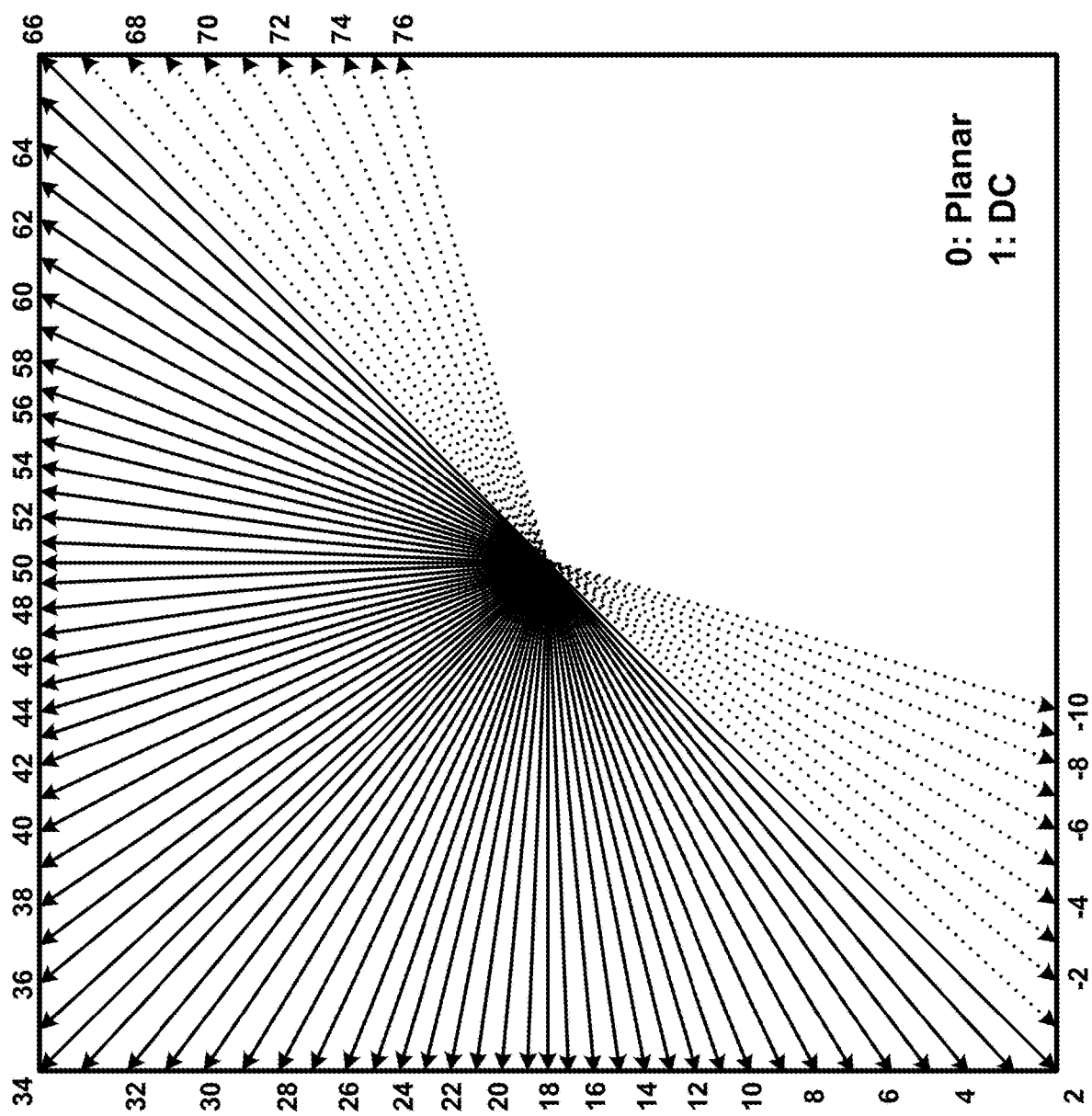
FIG. 6 is a conceptual diagram illustrating example intra prediction directions with wide angle directions.
Figure 7A:
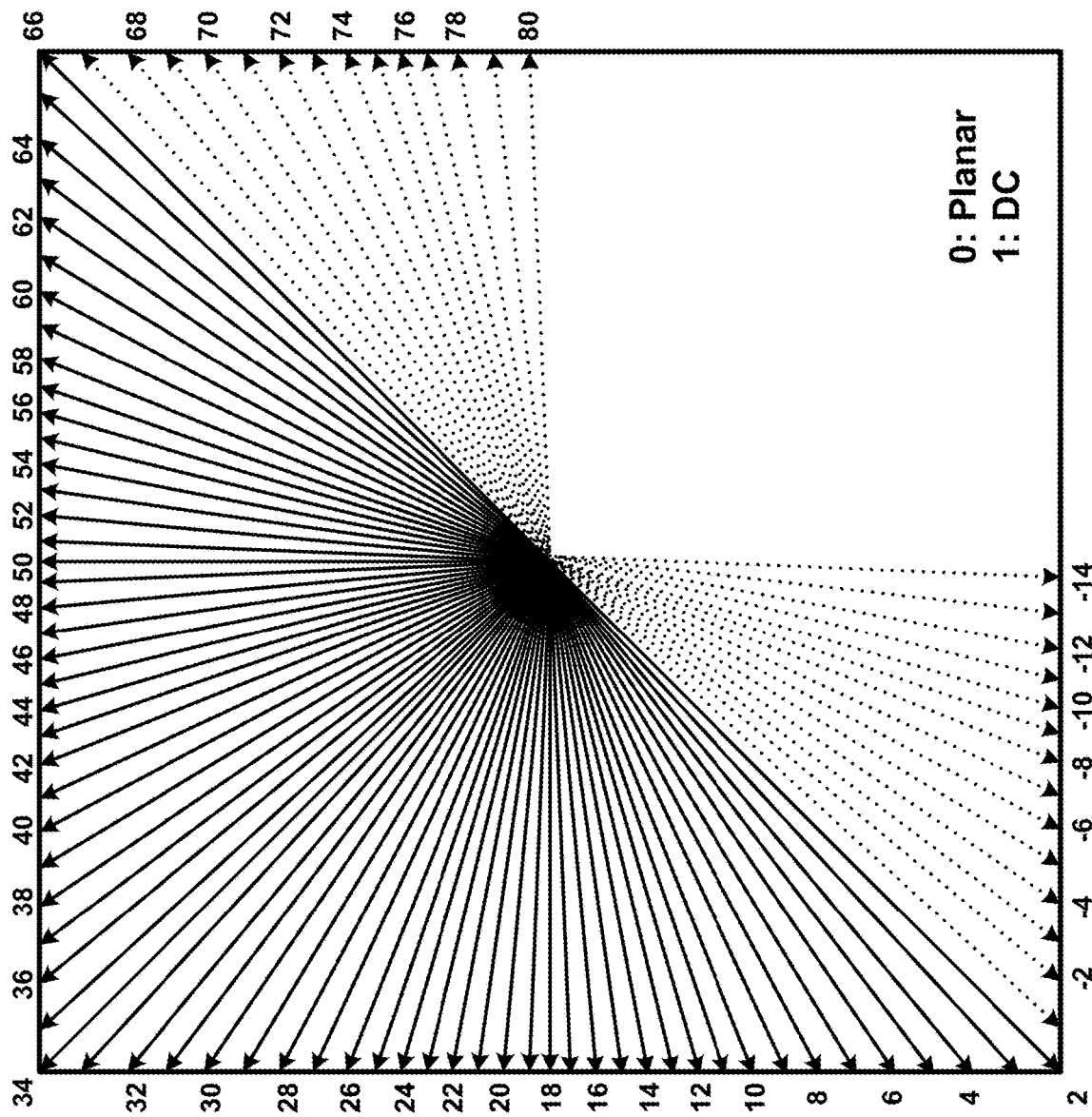
FIG. 7A is a conceptual diagram illustrating another example of intra prediction directions with wide angle directions.

FIG. 6 is an illustration of wide angles that are adopted in VTM2. FIG. 7A shows wide-angle modes (labeled −1 to −10 and 67 to 76 in FIG. 6) depicted in addition to the 65 angular modes. In the example of FIG. 7A, mode 50 corresponds to a prediction angle of −90 degrees. Mode 66 corresponds to a prediction angle of −135 degrees, and mode 2 corresponds to a prediction angle of 45 degrees.

Figure 8:
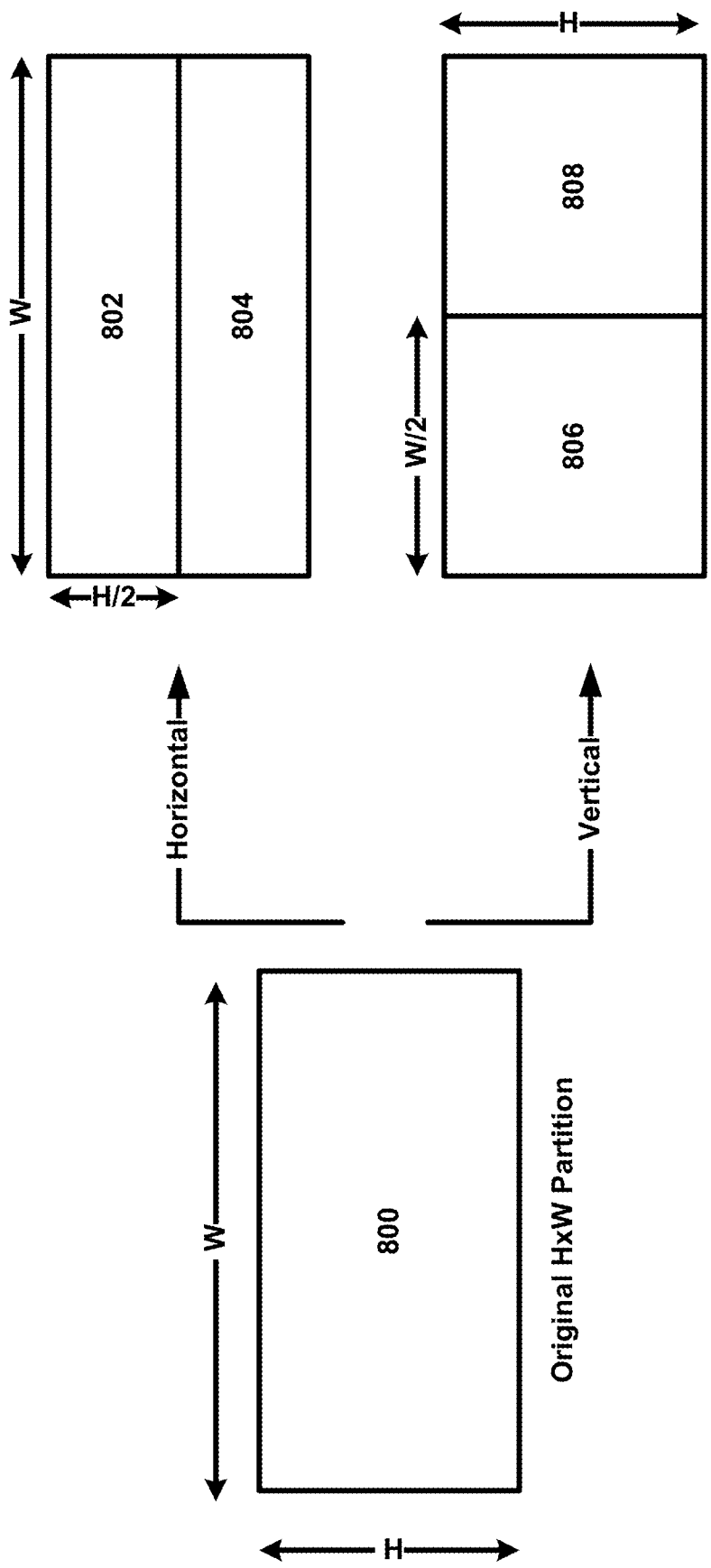
FIG. 8 is a conceptual diagram illustrating example vertical and horizontal divisions of a block.

FIG. 7A shows an example of wide angles (labeled −1 to −14 and 67 to 80 in FIG. 7A) in VTM3 beyond modes 2 and 66 for a total of 93 angular modes. In the example of FIG. 8, mode 50 corresponds to a prediction angle of −90 degrees. Mode 66 corresponds to a prediction angle of −135 degrees, and mode 2 corresponds to a prediction angle of 45 degrees. Although VTM3 defines 95 modes, for any block size only 67 modes are allowed. The exact modes that are allowed depend on the block width and height ratio. This is achieved by restricting the mode range based on block size.

FIG. 7B is a table showing the relationship between intra prediction mode and intra prediction angle. In particular, Table 1 in FIG. 7B specifies the mapping table between the intra prediction mode predModeIntra and the angle parameter intraPredAngle in VTM3. VTM3 is described in B. Bross, J. Chen, S. Liu, "Versatile Video Coding (Draft 3)," 12$^{th}$ JVET Meeting, Macau SAR, CN, October 2018, JVET-L100.

In Table 1, the angular modes corresponding with non-square block diagonals are shown with a caret symbol (^). The vertical and horizontal modes are shown with a pound sign (#) for reference. Square block diagonal modes are shown in Table 1 with an asterisk (*). In the following, angular modes with a positive intraPredAngle value are referred to as positive angular modes (mode index <18 or >50), while angular modes with a negative intraPredAngle value are referred to as negative angular modes (mode index >18 and <50).

The inverse angle parameter invAngle is derived based on intraPredAngle as follows:

$$invAngle = \text{Round}\left(\frac{256*32}{intraPredAngle}\right) \quad (2\text{-}1)$$

Note that intraPredAngle values that are multiples of 32 (0, 32, 64, 128, 256, 512) always correspond with prediction from non-fractional reference array samples, as is the case in the VTM3 specification.

TABLE 2

Diagonal modes corresponding with various block aspect ratios.

| Block aspect ratio (width/height) | Diagonal modes |
|---|---|
| 1 (square) | 2, 34, 66 |
| 2 | 8, 28, 72 |
| 4 | 12, 24, 76 |
| 8 | 14, 22, 78 |
| 16 | 16, 20, 80 |
| ½ | −6, 40, 60 |
| ¼ | −10, 44, 56 |
| ⅛ | −12, 46, 54 |
| 1/16 | −14, 48, 52 |

Video encoder 200 and video decoder 300 may be configured to perform intra sub-partition coding (ISP). An intra sub-partition (ISP) coding mode was been proposed in S. De Luxin Hernindez, H. Schwarz, D. Marpe, T. Wiegand (HHI) "CE3: Line-based intra coding mode," (hereinafter, "JVET-L0076"). When coding video data using the ISP coding mode, video encoder 200 and video decoder 300 may be configured to divide (e.g., split or partition) luma intra-predicted blocks vertically or horizontally into two (2) or four (4) sub-partitions depending on the block size dimensions. Examples of block splitting in the ISP coding mode are described below with respect to FIG. 8 and FIG. 9.

FIG. 8 is a conceptual diagram illustrating example vertical and horizontal divisions of a block. As shown in FIG. 8, current block 800 is an ISP block. That is, block 800 is a block that is to be split into sub-partitions, and each of the sub-partitions are to be coded using intra prediction. Current block 800 has a height (H) and a width. In the ISP coding mode, video encoder 200 and/or video decoder 300 may be configured to split current block 800 either horizontally or vertically. In the example of FIG. 8, video encoder 200 and/or video decoder 300 may be configured to split current block 800 into two sub-partitions. When using a horizontal split type, video encoder 200 and/or video decoder 300 may split current block 800 into sub-partition 802 and sub-partition 804. Each of sub-partition 802 and sub-partition 804 have a height equal to H/2 and a width equal to W. When using a vertical split type, video encoder 200 and/or video decoder 300 may split current block 800 into sub-partition 806 and sub-partition 808. Each of sub-partition 806 and sub-partition 808 have a height equal to H and a width equal to W/2.

Figure 9:
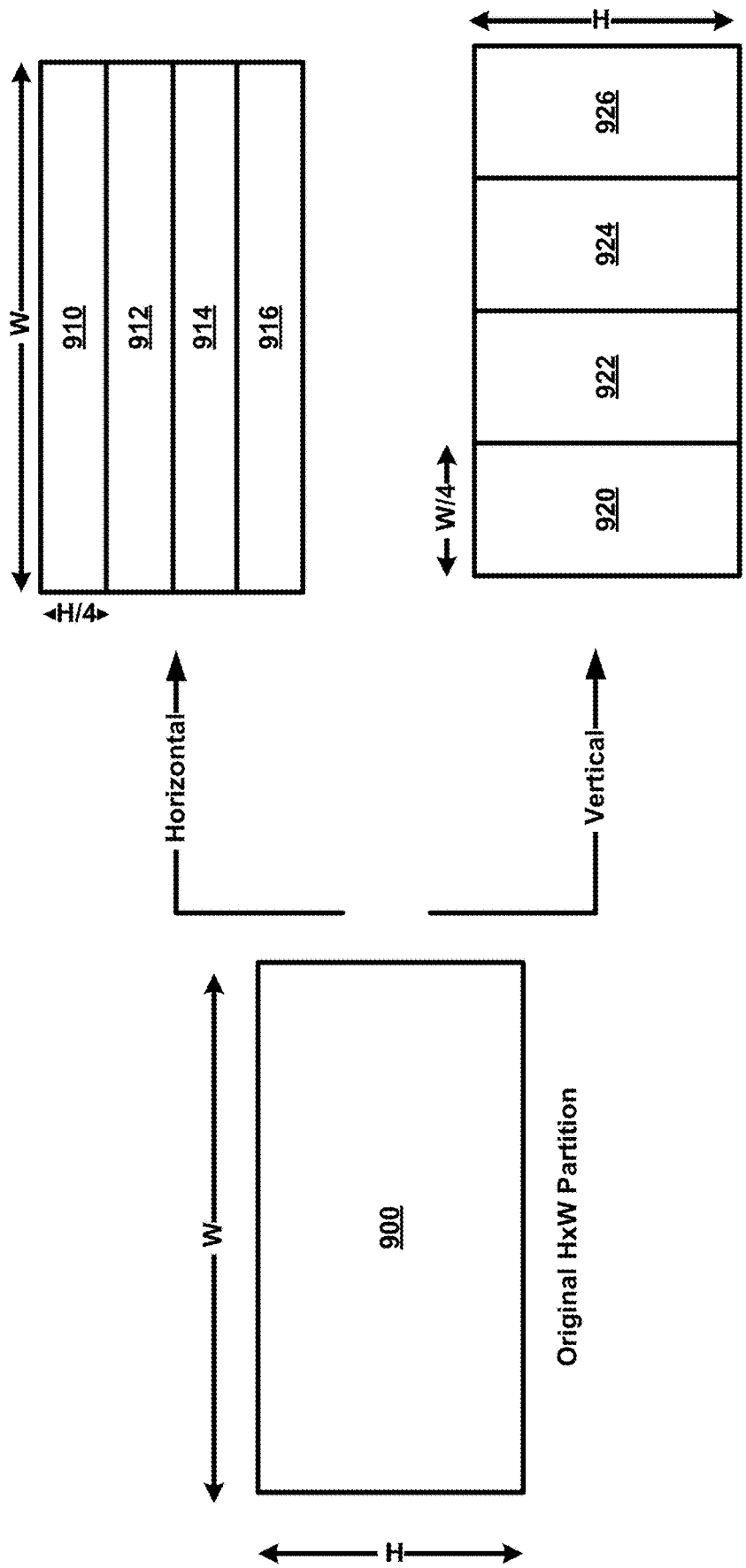
FIG. 9 is a conceptual diagram illustrating other examples of vertical and horizontal divisions of a block.

FIG. 9 is a conceptual diagram illustrating other examples of vertical and horizontal divisions of a block. FIG. 9 again shows current block 900, which is an ISP block. In this example, video encoder 200 and/or video decoder 300 may split current block 900 into four sub-partitions. When using a horizontal split type, video encoder 200 and/or video decoder 300 may split current block 900 into sub-partition 910, sub-partition 912, sub-partition 914, and sub-partition 916. Each of sub-partition 910, sub-partition 912, sub-partition 914, and sub-partition 916 have height equal to H/4 and a width equal to W. When using a vertical split type, video encoder 200 and/or video decoder 300 may split current block 900 into sub-partition 920, sub-partition 922, sub-partition 924, and sub-partition 926. Each of sub-partition 920, sub-partition 922, sub-partition 924, and sub-partition 926 have a height equal to H and a width equal to W/4.

FIG. 8 and FIG. 9 are merely example split types. In other examples of ISP, a current block may be split into any number of partitions (e.g., 3, 5, 6, etc.). In addition, in some examples, the sizes of the sub-partitions need not be symmetrical. That is, the sub-partitions may have different sizes.

In one example, based on the intra coding mode and split type utilized, two different classes of processing orders may be used, which are referred to as "normal" order and "reversed" order. In the normal order, the first sub-partition to be processed is the sub-partition containing the top-left sample of the CU, and then continuing downwards (horizontal split) or rightwards (vertical split). Video encoder 200 may signal a bit that indicates the splitting type (e.g., horizontal or vertical split) of the CU to video decoder 300. In another example, the reverse processing order either starts with the sub-partition containing the bottom-left sample of the CU and continues upwards, or starts with the sub-partition containing the top-right sample of the CU and continues leftwards.

A variation of ISP that uses only the normal processing order is used in JVET WD4. It is to be noted that the terms subblock and sub-partitions are used interchangeably in this document, and both refer to the blocks obtained by partitioning a coding block using ISP.

Some syntax and semantics associated with ISP in JVET WD4 are shown below, with the symbols <<>> and <</> showing relevant syntax.

Syntax Table of Coding Unit

| | Descriptor |
|---|---|
| coding_unit( x0, y0, cbWidth, cbHeight, treeType ) { ... } else {     if( treeType = = SINGLE_TREE \|\| treeType = = DUAL_TREE_LUMA ) {         if( ( y0 % CtbSizeY ) > 0 )             intra_luma_ref_idx[ x0 ][ y0 ] <<>>if (intra_luma_ref_idx[ x0 ][ y0 ] = = 0 && <</>> <<>> ( cbWidth <= MaxTbSizeY \|\| cbHeight <= MaxTbSizeY ) &&<</>> <<**>> ( cbWidth * cbHeight > MinTbSizeY * MinTbSizeY )) <</>> <<>>intra_subpartitions_mode_flag[ x0 ][ y0 ] <</>> | ae(v) <<>> ae(v) |

-continued

| | Descriptor |
|---|---|
| <<>>if( intra_subpartitions_mode_flag[ x0 ][ y0 ] = = 1 && <</>> <<>>cbWidth <= MaxTbSizeY && cbHeight <= MaxTbSizeY ) <</>> <<>>intra_subpartitions_split_flag[ x0 ][ y0 ] <</>> if( intra_luma_ref_idx[ x0 ][ y0 ] = = 0 && intra_subpartitions_mode_flag[ x0 ][ y0 ] = = 0 ) intra_luma_mpm_flag[ x0 ][ y0 ] if( intra_luma_mpm_flag[ x0 ][ y0 ] ) intra_luma_mpm_idx[ x0 ][ y0 ] ... | <</>> <<>> ae(v) <</**>> ae(v) ae(v) |

Syntax Table of Transform Tree

| | Descriptor |
|---|---|
| transform_tree( x0, y0, tbWidth, tbHeight, treeType) { <<>>InferTuCbfLuma = 1<</>> <<>>if( IntraSubPartSplitType = = NO_ISP_SPLIT ) {<</>> if( tbWidth > MaxTbSizeY \|\| tbHeight > MaxTbSizeY ) { trafoWidth = ( tbWidth > MaxTbSizeY ) ? (tbWidth / 2) : tbWidth trafoHeight = ( tbHeight > MaxTbSizeY ) ? (tbHeight / 2) : tbHeight transform_tree( x0, y0, trafoWidth, trafoHeight ) if( tbWidth > MaxTbSizeY ) transform_tree( x0 + trafoWidth, y0, trafoWidth, trafoHeight, treeType ) if( tbHeight > MaxTbSizeY ) transform_tree( x0, y0 + trafoHeight, trafoWidth, trafoHeight, treeType ) if( tbWidth > MaxTbSizeY && tbHeight > MaxTbSizeY ) transform_tree( x0 + trafoWidth, y0 + trafoHeight, trafoWidth, trafoHeight, treeType ) } else { transform_unit( x0, y0, tbWidth, tbHeight, treeType, 0 ) } <<>>} else if( IntraSubPartitionsSplitType = = ISP_HOR_SPLIT ) {<</>> <<>>trafoHeight = tbHeight / NumIntraSubPartitions<</>> <<>>for( partIdx = 0; partIdx < NumIntraSubPartitions; partIdx++ )<</>> <<**>>transform_unit( x0, y0 + trafoHeight * partIdx, tbWidth, trafoHeight, treeType, partIdx ) «/»» <<>>} else if( IntraSubPartitionsSplitType = = ISP_VER_SPLIT ) {<</>> <<>>trafoWidth = tbWidth / NumIntraSubPartitions<</>> <<>>for( partIdx = 0; partIdx < NumIntraSubPartitions; partIdx++ ) <<**>>transform_unit( x0 + trafoWidth * partIdx, y0, trafoWidth, tbHeight, treeType, partIdx ) <</>> <<>>} } | |

Semantics of a Coding Unit

<<**>>intra_subpartitions_mode_flag[x0][y0] equal to 1 specifies that the current intra coding unit is partitioned into NumIntraSubPartitions[x0][y0] rectangular transform block subpartitions. intra_subpartitions_mode_flag[x0][y0] equal to 0 specifies that the current intra coding unit is not partitioned into rectangular transform block subpartitions.

When intra_subpartitions_mode_flag[x0][y0] is not present, it is inferred to be equal to 0.

intra_subpartitions_split_flag[x0][y0] specifies whether the intra subpartitions split type is horizontal or vertical. When intra_subpartitions_mode_flag[x0][y0] is not present, it is inferred to be equal to 0.

The variable IntraSubPartitionsSplitType specifies the type of split used for the current luma coding block as illustrated in Table 2-3. IntraSubPartitionsSplitType is derived as follows:

If intra_subpartitions_mode_flag[x0][y0] is equal to 0, IntraSubPartitionsSplitType is set equal to 0.

Otherwise, the IntraSubPartitionsSplitType is set equal to 1+intra_subpartitions_split_flag[x0][y0].

TABLE 2-3

Name association to IntraSubPartitionsSplitType

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The variable NumIntraSubPartitions specifies the number of transform block subpartitions an intra luma coding block is divided into. NumIntraSubPartitions is derived as follows:

If IntraSubPartitionsSplitType is equal to ISP_NO_SPLIT, NumIntraSubPartitions is set equal to 1.

Otherwise, if one of the following conditions is true, NumIntraSubPartitions is set equal to 2:
cbWidth is equal to 4 and cbHeight is equal to 8,
cbWidth is equal to 8 and cbHeight is equal to 4.

Otherwise, NumIntraSubPartitions is set equal to 4.
<<</**>>

Figure 10:
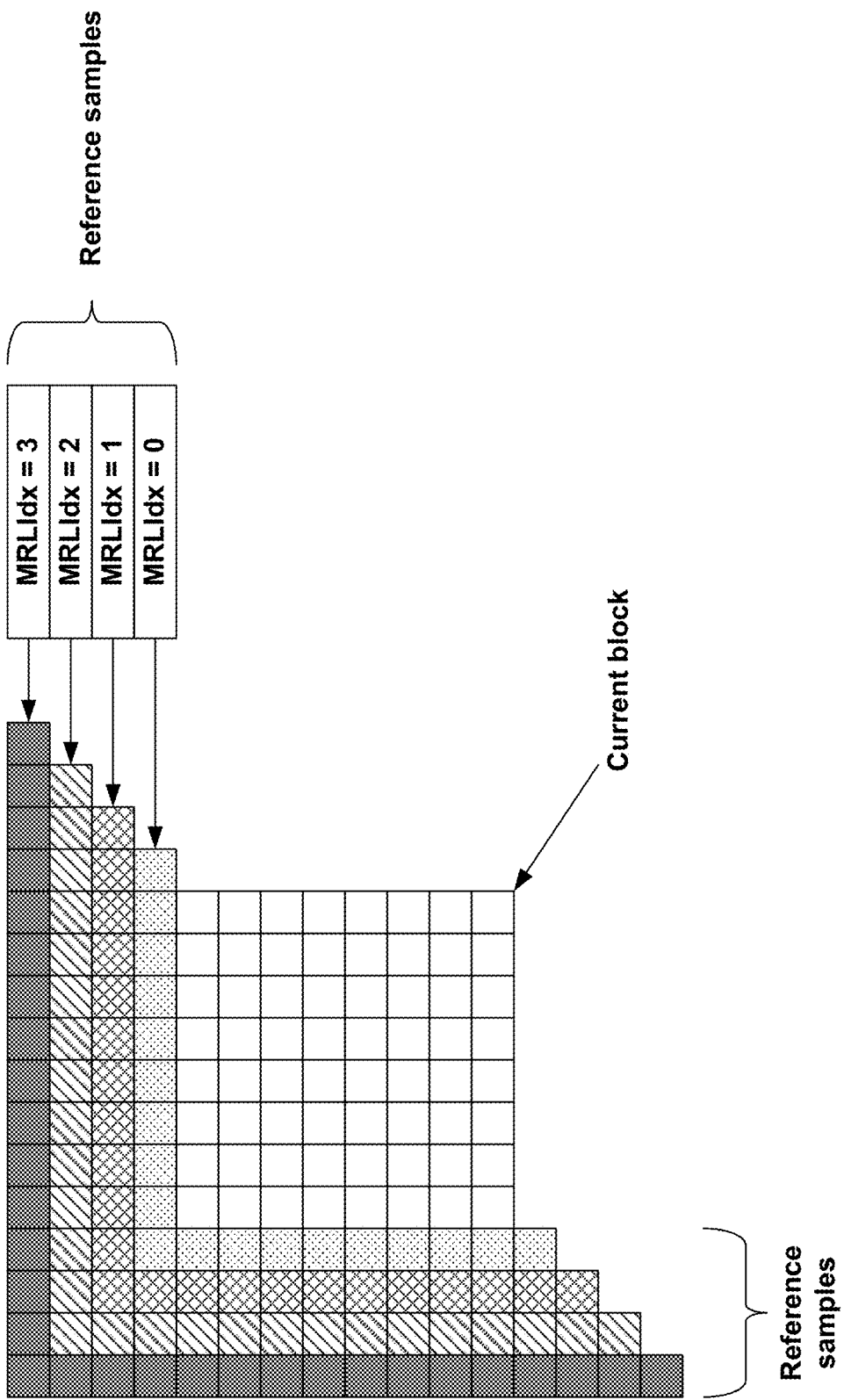
FIG. 10 is an illustration of reference samples from multiple reference lines that may be used for intra prediction of the coding block.

FIG. 10 shows an illustration of reference samples from multiple reference lines that may be used for intra prediction of the coding block. Video encoder 200 and video decoder 300 may be configured to perform multiple reference line prediction. The samples in the neighborhood of a coding block are used for intra prediction of the block. Typically, the reconstructed reference sample lines that are closest to the left and the top boundaries of the coding block are used as the reference samples for intra prediction. However, VVC WD4 also enables other samples in the neighborhood of the coding block to be used as reference samples. FIG. 10 illustrates the reference sample lines that may be used for intra prediction. For each coding block, an index is signaled that indicates the reference line that is used.

In VVC WD4, only reference lines with MIRLIdx equal to 0, 1 and 3 can be used. The index to the reference line used for coding the block (values 0, 1 and 2 indicating lines with MRLIdx 0, 1 and 3, respectively) is coded with truncated unary codeword. Planar and DC modes are not used for the reference line used has MRLIdx>0.

Video encoder 200 and video decoder 300 may be configured to perform position dependent intra prediction combination. Block-based intra prediction is part of video standards such AVC, HEVC, VVC, etc. Typically, lines of reference samples from adjacent reconstructed blocks are used for predicting samples within the current block. One or multiple lines of samples may be used for prediction. The reference samples are employed by typical intra prediction modes such as DC, planar, and angular/directional modes.

Position Dependent Intra Prediction Combination (PDPC) was proposed in J. Pfaff, B. Stallenberger, M. Schafer, P. Merkle, P. Helle, T. Hinz, H. Schwarz, D. Marpe, T. Wiegand (HHI) "CE3: Affine linear weighted intra prediction (CE3-4.1, CE3-4.2)" (JVET-N0217) and further simplified in JVET-M0102. In J. Chen, Y. Ye, S. H. Kim, "Algorithm description for Versatile Video Coding and Test Model 3 (VTM3)" (JVET-L1002), Macao, CN, October 2018, submitted to JVET's call for proposals, PDPC is applied to planar, DC, horizontal and vertical modes without signaling as summarized in the following. In F. Bossen, K. Misra, "Non-CE3: A unified luma intra mode list construction process" (JVET-M0528), PDPC was further extended to diagonal directional modes and modes adjacent to diagonal directional modes.

The prediction sample pred(x,y) located at (x, y) is predicted with an intra prediction mode (DC, planar, angular) and its value is modified using the PDPC expression for a single reference sample line:

$$\text{pred}(x,y)=(wL \times R_{-1,y}+wT \times R_{x,-1}-wTL \times R_{-1,-1}+(64-wL-wT+wTL) \times \text{pred}(x,y)+32)>>6, \quad \text{(Eq. 1)}$$

where $R_{x,-1}$, $R_{-1,y}$ represent the reference samples located at the top and left of the current sample (x, y), respectively, and $R_{-1,-1}$ represents the reference sample located at the top-left corner of the current block. For the DC mode, the weights are calculated as follows for a block with dimensions width and height:

$$wT=32>>((y<<1)>>\text{shift}), wL=32>>((x<<1)>>\text{shift}), wTL=(wL>>4)+(wT>>4),$$

with shift=$(\log_2(\text{width})+\log_2(\text{height})+2)>>2$, while for planar mode wTL=0, for horizontal mode wTL=wT and for vertical mode wTL=wL. The PDPC weights can be calculated with adds and shifts only. The value of pred(xy) can be computed in a single step using Eq. 1.

Figure 11B:
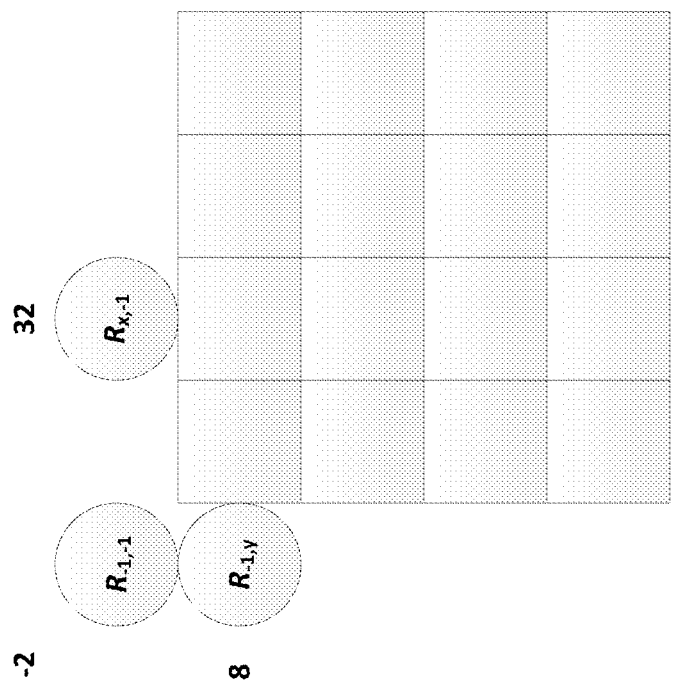
FIGS. 11A and 11B are conceptual diagrams illustrating examples of DC mode PDPC weights for sample positions inside a 4×4 block.
Figure 11A:
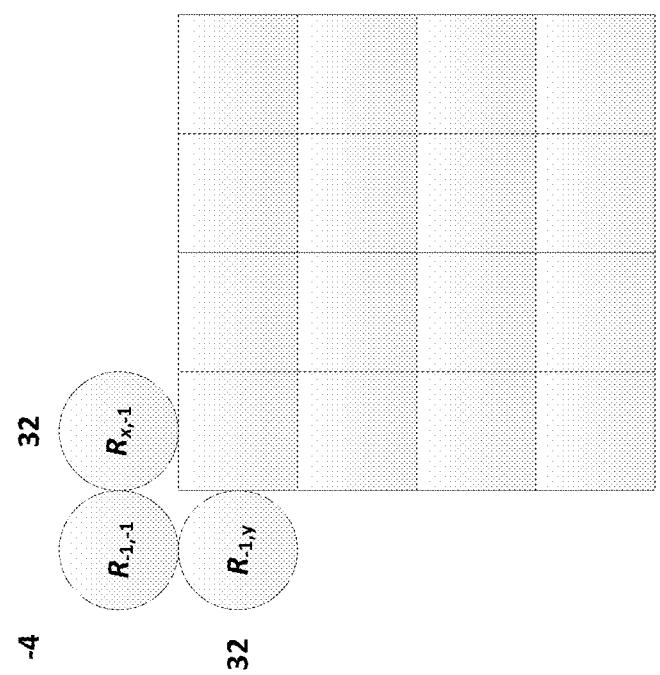

FIG. 11A illustrates DC mode PDPC weights (wL, wT, wTL) for (0, 0) position inside one 4×4 block. FIG. 11B illustrates DC mode PDPC weights (wL, wT, wTL) for (1, 0) position inside one 4×4 block. If PDPC is applied to DC, planar, horizontal, and vertical intra modes, additional boundary filters are not applied, such as the DC mode boundary filter or horizontal/vertical mode edge filters. The Equation 1 may be generalized to include additional reference sample lines (e.g., not limited to samples one row above or one row left of the current block). In this case, multiple reference samples are available in the neighborhoods of Rx,−1, R−1,y, R−1,−1 and each may have a weight assigned that can be optimized, for example, by training.

Figure 12:
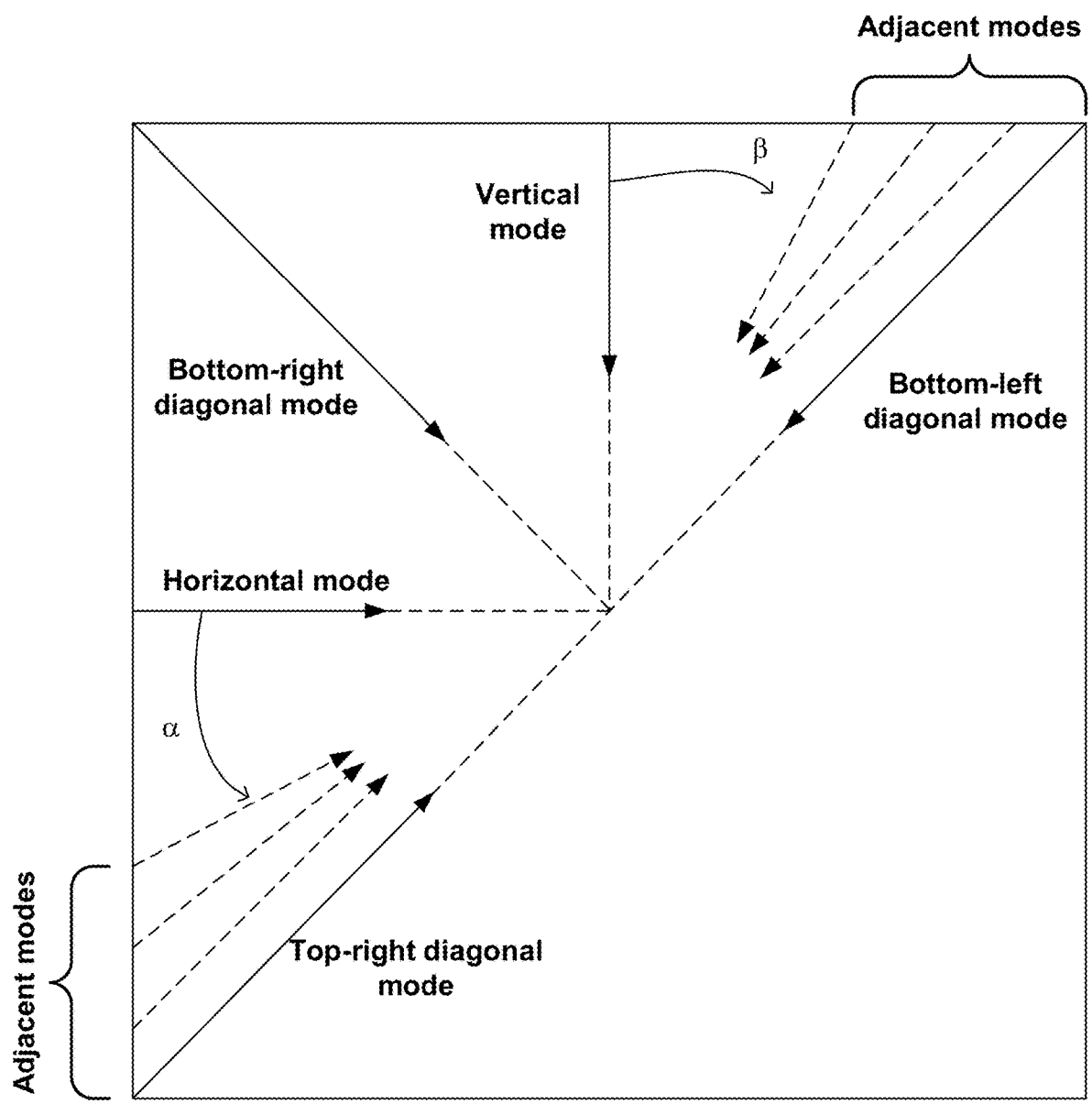
FIG. 12 is a conceptual diagram illustrating examples of intra prediction angular modes.

The techniques described in U.S. patent application Ser. No. 16/371,638, filed Apr. 1, 2019, extend PDPC to the diagonal intra modes and to the angular modes that are adjacent to the diagonal modes. The intended diagonal intra modes are the modes that predict according to the bottom-left and top-right directions, as well as several adjacent angular modes, for example, N adjacent modes between the bottom-left diagonal mode and vertical mode, and N or M adjacent modes between the top-right diagonal mode and horizontal mode. FIG. 12 illustrates the identification of the angular modes. In general, the adjacent modes may be a selected subset of available angular modes. The spacing between angular modes may be nonuniform and some angular modes may be skipped.

Figure 13A:
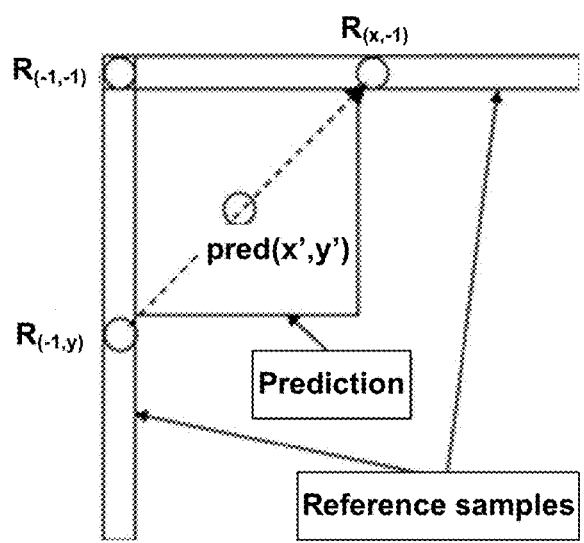
FIG. 13A is a conceptual diagram illustrating an example of a diagonal top-right mode.

FIGS. 13A-13D illustrate definition of samples used by PDPC extension to diagonal and adjacent angular intra modes. FIG. 13A illustrates the definition of reference samples Rx,−1, R−1,y and R−1,−1 for the extension of PDPC to the top-right diagonal mode. The prediction sample pred(x', y') is located at (x', y') within the prediction block. The coordinate x of the reference sample Rx,−1 is given by: x=x'+y'+1 and the coordinate y of the reference sample R−1,y is similarly given by: y=x'+y'+1. The PDPC weights for the top-right diagonal mode are, for example: wT=16>>((y'<<1)>>shift), wL=16>>((x'<<1)>>shift), wTL=0.

Figure 13B:
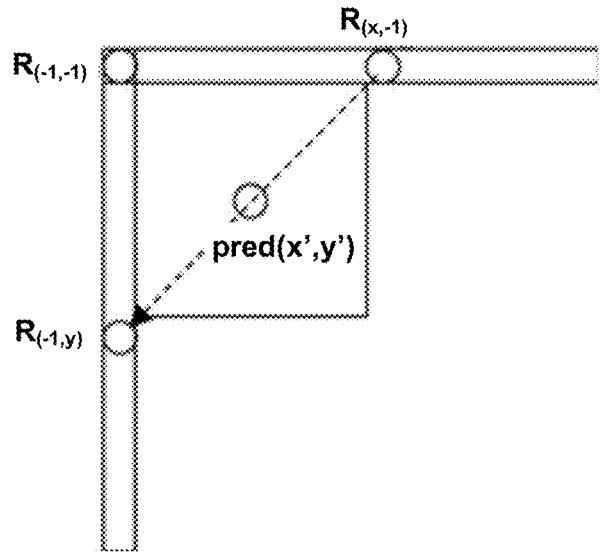
FIG. 13B is a conceptual diagram illustrating an example of a diagonal bottom-left mode.

Similarly, FIG. 13B illustrates the definition of reference samples Rx,−1, R−1,y and R−1,−1 for the extension of PDPC to the bottom-left diagonal mode. The coordinate x of the reference sample Rx,−1 is given by: x=x'+y'+1, and the coordinate y of the reference sample R−1,y is: y=x'+y'+1. The PDPC weights for the top-right diagonal mode are, for example: wT=16>>((y'<1)>>shift), wL=16>>((x'<<1)>>shift), wTL=0.

In FIGS. 13A and 13B, video encoder 200 and video decoder 300 may each determine a row that is above the current block (e.g., immediately above but the techniques are not so limited) and determine an x-coordinate in the determined row. The x-coordinate in the determined row is equal to an x-coordinate of the prediction sample plus a y-coordinate of the prediction sample plus 1. Video encoder 200 and video decoder 300 may determine a reference sample of the one or more reference samples based on the determined row and the determined x-coordinate.

Similarly, in FIGS. 13A and 13B, video encoder 200 and video decoder 300 may determine a column that is left of the current block (e.g., immediately left but the techniques are not so limited) and determine a y-coordinate in the determined column. The y-coordinate in the determined column is equal to an x-coordinate of the prediction sample plus a y-coordinate of the prediction sample plus 1. Video encoder 200 and video decoder 300 may determine a reference sample of the one or more reference samples based on the determined column and the determined y-coordinate.

Based on the determined x and y-coordinates, video encoder 200 and video decoder 300 may determine the reference samples (e.g., a first reference sample based on the determined row and determined x-coordinate and a second reference sample based on the determined column and determined y-coordinate). Also, video encoder 200 and video decoder 300 may determine the weights according to the above example techniques for the diagonal modes (e.g., top-right diagonal mode and bottom-left diagonal mode, as two examples). Then, based on Equation 1 (as one non-limiting example), video encoder 200 and video decoder 300 may determine the modified prediction sample (e.g., pred (x,y)).

Figure 13C:
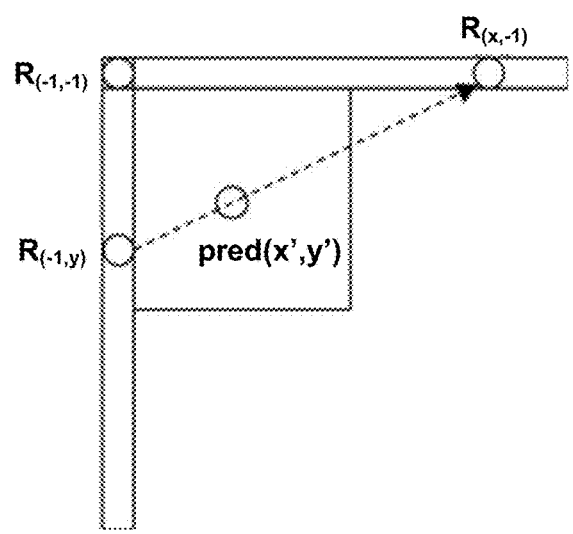
FIG. 13C is a conceptual diagram illustrating an example of an adjacent diagonal top-right mode.

The case of an adjacent top-right diagonal mode is illustrated in FIG. 13C. In general, for the angle $\alpha$ defined in FIG. 3, the y coordinate of the reference sample R−1,y is determined as follows: $y=y'+\tan(\alpha)\times(x'+1)$ and the x coordinate of Rx,−1 is given by: $x=x'+\cotan(\alpha)\times(y'+1)$, with $\tan(\alpha)$ and $\cotan(\alpha)$ the tangent and cotangent of the angle $\alpha$. The PDPC weights for an adjacent top-right diagonal mode are, for example: wT=32>>((y'<<1)>>shift), wL=32>>((x'<<1)>>shift), wTL=0 or wT=32>>((y'<<1)>>shift), wL=0, wTL=0.

Figure 13D:
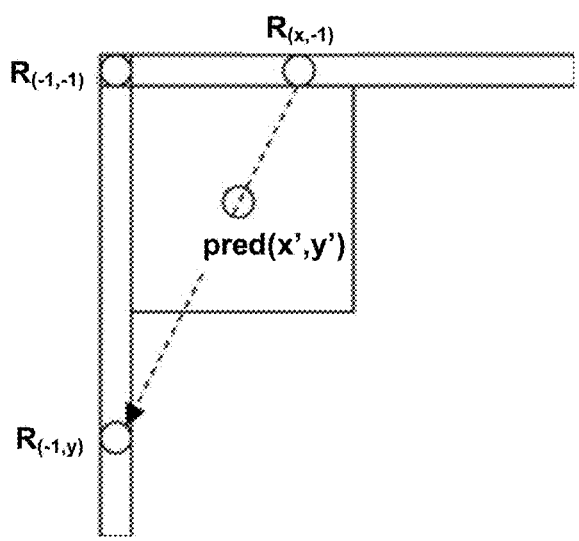
FIG. 13D is a conceptual diagram illustrating an example of an adjacent diagonal bottom-left mode.

Similarly, the case of an adjacent bottom-left diagonal mode is illustrated in FIG. 13D. In general, for the angle $\beta$ defined in FIG. 3, the x coordinate of the reference sample Rx,−1 is determined as follows $x=x'+\tan(\beta)\times(y'+1)$ and the y coordinate of R−1,y is given by $y=y'+\cotan(\beta)\times(x'+1)$, with $\tan(\beta)$ and $\cotan(\beta)$ the tangent and cotangent of the angle. The PDPC weights for an adjacent bottom-left diagonal mode are, for example: wL=32>>((x'<<1)>>shift), wT=32>>((y'<<1)>>shift), wTL=0 or wL=32>>((x'<<1)>>shift), wT=0, wTL=0.

In FIGS. 13C and 13D, video encoder 200 and video decoder 300 may each determine a row that is above the current block (e.g., immediately above but the techniques are not so limited) and determine an x-coordinate in the determined row. The x-coordinate in the determined row is based on an angle of the angular intra prediction mode. Video encoder 200 and video decoder 300 may determine a reference sample of the one or more reference samples based on the determined row and the determined x-coordinate.

To determine the x-coordinate in the determined row, video encoder 200 and video decoder 300 may determine one of a cotangent (e.g., for adjacent top-right diagonal mode) or tangent (e.g., for adjacent bottom-left diagonal mode) of the angle of the angular intra prediction mode. Video encoder 200 and video decoder 300 may determine the x-coordinate in the determined row based on one of the cotangent or tangent of the angle of the angular intra prediction mode, an x-coordinate of the prediction sample, and a y-coordinate of the prediction sample. For instance, for adjacent top-right diagonal angular intra prediction mode, the x-coordinate in the determined row is equal to $x'+\cotan(\alpha)\times(y'+1)$ and for adjacent bottom-left diagonal mode, the x-coordinate in the determined row is equal to $x'+\tan(\beta)\times(y'+1)$, where x' and y' are the x and y-coordinates of the prediction sample being modified.

Similarly, in FIGS. 13C and 13D, video encoder 200 and video decoder 300 may each determine a column that is left of the current block (e.g., immediately left but the techniques are not so limited) and determine a y-coordinate in the determined column. The y-coordinate in the determined column is based on an angle of the angular intra prediction mode. Video encoder 200 and video decoder 300 may determine a reference sample of the one or more reference samples based on the determined column and the determined y-coordinate.

To determine the y-coordinate in the determined column, video encoder 200 and video decoder 300 may determine one of a cotangent (e.g., for adjacent bottom-left diagonal mode) or tangent (e.g., for adjacent top-right diagonal mode) of the angle of the angular intra prediction mode. Video encoder 200 and video decoder 300 may determine the y-coordinate in the determined column based on one of the cotangent or tangent of the angle of the angular intra prediction mode, an x-coordinate of the prediction sample, and a y-coordinate of the prediction sample. For instance, for adjacent top-right diagonal angular intra prediction mode, the y-coordinate in the determined column is equal to $y'+\tan(\alpha)\times(x'+1)$ and for adjacent bottom-left diagonal mode, the y-coordinate in the determined column is equal to $y'+\cotan(\beta)\times(x'+1)$, where x' and y' are the x and y-coordinates of the prediction sample being modified.

Based on the determined x and y-coordinates, video encoder 200 and video decoder 300 may determine the reference samples (e.g., a first reference sample based on the determined row and determined x-coordinate and a second reference sample based on the determined column and determined y-coordinate). Also, video encoder 200 and video decoder 300 may determine the weights according to the above example techniques for the adjacent diagonal modes (e.g., adjacent top-right diagonal mode and adjacent bottom-left diagonal mode, as two examples). Then, based on Equation 1 (as one non-limiting example), video encoder 200 and video decoder 300 may determine the modified prediction sample (e.g., pred(x,y)).

The above describes example techniques for the top-right and bottom-left diagonal modes and the adjacent top-right and adjacent bottom-left diagonal modes as example angular modes for which PDPC can be applied. The example techniques may be extended to other angular modes as well. Also, in some examples, the one or more reference samples have both an x- and y-coordinate that is different than both an x- and y-coordinate of the prediction sample in the prediction block. For instance, in the above example equations to determine the x and y coordinates in respective rows and columns to determine the reference samples, the x coordinate is different than the x coordinate of the prediction sample being modified and the y coordinate is different than the y coordinate of the prediction sample being modified. That is, the reference samples may not be in the same row or same column as the prediction sample being modified.

As is the case for DC, planar, horizontal and vertical mode PDPC, there is no additional boundary filtering, for example as specified in 'J. Chen, E. Alshina, G. J. Sullivan, J.-R. Ohm, J. Boyce, "Algorithm description of Joint Exploration Test Model 7," 7th JVET Meeting, Torino, Italy, July 2017, JVET-G1001, for diagonal and adjacent diagonal modes when PDPC is extended to these angular modes.

Video encoder 200 and video decoder 300 may be configured to perform ALWIP. That is, video encoder 200 and video decoder 300 may be configured to encode and decoded blocks of video data in an ALWIP mode. ALWIP as described in JVET-N0217 generates a prediction of a block from the neighboring reference samples using an affine linear weighted prediction model. The neighboring samples are first processed. In some cases, the neighboring samples are downsampled and then used to derive (using the affine model) a set of reduced samples which resembles an intermediate downsampled version of the predicted samples. The final prediction is obtained by upsampling (as necessary) the intermediate values.

Figure 14:
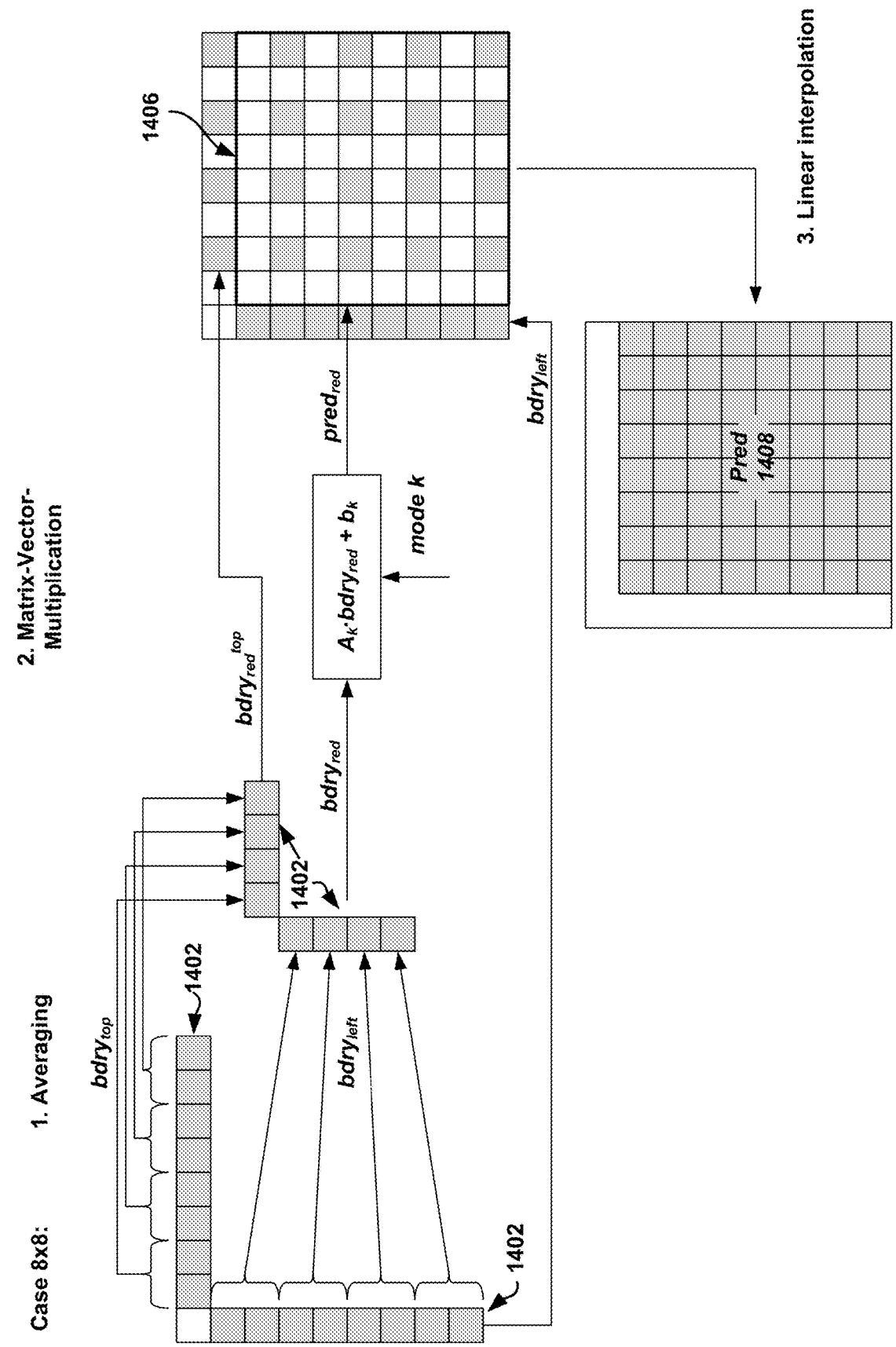
FIG. 14 is a conceptual diagram illustrating an example of an affine linear weighted intra prediction (ALWIP) process on 8×8 block.

An illustration of the ALWIP process is given in FIG. 14. FIG. 14 shows an example ALWIP process for an 8×8 block. Boundary samples 1402 represent neighboring samples on the boundary of the 8×8 block and include both top boundary samples (bdry$_{top}$) above the 8×8 block, and left boundary samples (bdry$_{left}$) to the left of the 8×8 block. Video encoder 200 or video decoder 300 downsamples boundary samples 1402 to obtain reduced boundary samples 1404, which include both top reduced boundary samples (bdry$_{red}^{top}$) and left reduced boundary samples (bdry$_{red}^{left}$).

Video encoder 200 or video decoder 300 multiply a vector representation of the boundary samples, bdry$_{red}$, with a matrix A$_k$ and add an offset/bias term b$_k$ to obtain a down-sampled version of the predicted block, pred$_{red}$, which is represented by the gray samples inside block 1406. Video encoder 200 or video decoder 300 obtains a final prediction block 1408 by upsampling the predicted samples pred$_{red}$ along with the boundary samples to determine values for the other samples, i.e., the white samples, in block 1406. The matrix A$_k$ and an offset, or bias, vector b$_k$ are chosen based on the mode value indicated for the block.

An illustration of the ALWIP process is given in FIG. 11. The ALWIP process of FIG. 11 may be performed by video encoder 200 and video decoder 300. The reference samples of the block (also referred to as boundary samples) are down-sampled to obtain reduced boundary samples. The vector representation of the boundary samples, bdry$_{red}$, is multiplied with a matrix A$_k$ and an offset/bias term b$_k$ is added to obtain a down-sampled version of the predicted block, pred$_{red}$. The final prediction is obtained by up-sampling these predicted samples pred$_{red}$ along with the boundary samples. The matrix A$_k$ and an offset/bias vector b$_k$ are chosen based on a mode value indicated for the block. A combination of a matrix A$_k$ and an offset/bias vector b$_k$ may be referred to herein as an "ALWIP mode."

To derive the intermediate predicted samples, video encoder 200 and video decoder 300 use an affine linear weighted prediction model. Three types are defined.

The number of intermediate samples derived differ for each type as follows:
1) 4×4 for block sizes of width and height both equal to 4
2) 8×8 for block sizes of width and height both less than equal to 8 except when both width and height are equal to 4 (i.e., 4×8, 8×4 and 8×8 blocks)
3) 16×16 for blocks whereat least one of width and height is greater than 8.

In each of these three cases, a different number of ALWIP modes are used: 35, 19, and 11, respectively.

Video encoder 200 and video decoder 300 may be configured to signal the ALWIP as follows:
 a) A flag (alwip_flag) is signaled to indicate that that the current block is coded with ALWIP.
 b) When the block is coded with ALWIP, another flag is signaled to indicate whether the current block is coded with an ALWIP-MPM mode or not.
  a. If the current block is coded with the ALWIP MPM, then the MPM index is signaled.
  b. Else, an index to the remaining mode value is signaled.

The alwip_flag may be context coded with four contexts allowed:

If block width >2*height or height >2*width, context 3 is used.
Else context ctxId is used, where ctxId is derived as follows:
 Initialized ctxId to 0
 If left neighboring block is coded with ALWIP, ctxId++
 If above neighboring block is coded with ALWIP, ctxId++

Video encoder 200 and video decoder 300 may be configure to derive of the ALWIP MPM as follows:
 1) LeftIntraMode and AboveIntraMode are initialized to −1
 2) If left neighboring block is intra coded
  a. If the left neighboring block is coded with ALWIP mode L
   i. If L is of the same ALWIP type as the current block, then LeftIntraMode is set equal to L.
  b. The intra mode of left neighboring block is mapped to an ALWIP mode of the same type as the current block, and assigned to LeftIntraMode.
 3) If above neighboring block is intra coded:
  a. If the above neighboring block is coded with ALWIP mode A
   i. If A is of the same ALWIP type as the current block, then AboveIntraMode is set equal to A.
  b. The intra mode of above neighboring block is mapped to an ALWIP mode of the same type as the current block, and assigned to AboveIntraMode.
 4) The MPMs are then derived based on LeftIntraMode and AboveIntraMode.

In this disclosure, blocks coded with ALWIP may be referred to as ALWIP-coded blocks or ALWIP blocks; other blocks (coded with regular intra prediction, intra sub-partitions, or multiple reference lines) may be referred to as non-ALWIP blocks.

Video encoder 200 and video decoder 300 may be configured to perform single step linear interpolation. For a W×H block with max(W, H)≥8, the prediction signal arises from the reduced prediction signal pred$_{red}$ on W$_{red}$×H$_{red}$ by linear interpolation. Depending on the block shape, video encoder 200 and video decoder 300 perform linear interpolation in vertical, horizontal or both directions. In some examples, if linear interpolation is to be applied in both directions, then video encoder 200 and video decoder 300 first applies linear interpolation in a horizontal direction if W<H or first in the vertical direction otherwise.

Consider without loss of generality a W×H block with max(W, H)≥8 and W≥H. Then, video encoder 200 and video decoder 300 may perform the one-dimensional linear interpolation as follows. For purposes of explanation, linear interpolation will be described with respect to a vertical direction. First, the reduced prediction signal is extended to the top by the boundary signal. Define the vertical upsampling factor U$_{ver}$=H/H$_{red}$ and write U$_{ver}$=2$^{u_{ver}}$>1. Then, define the extended reduced prediction signal by $$pred_{red}[x][-1] = \begin{cases} bdry_{red}^{top}[x] & \text{for } W = 8 \\ bdry_{redII}^{top}[x] & \text{for } W > 8 \end{cases}.$$

Then, from this extended reduced prediction signal, the vertically linear interpolated prediction signal is generated by $$pred_{red}^{ups,ver}[x][U_{ver} \cdot y + k] =$$

$$\left((U_{ver} - k - 1) \cdot pred_{red}[x][y-1] + (k+1) \cdot pred_{red}[x][y] + \frac{U_{ver}}{2}\right) \gg u_{ver} \text{ for}$$

$$0 \leq x < W_{red}, 0 \leq y < H_{red} \text{ and } 0 \leq k < U_{ver}.$$

The techniques described above include some potential problems. ALWIP generates a set of "intermediate" predicted samples by multiplying reduced boundary samples with a matrix and a bias vector. The intermediate samples are then upsampled using linear interpolation as necessary to generate the predicted block. Although the matrix used for ALWIP is chosen from a set of several matrices, any finite set of matrices may not (and in some cases may be impossible) efficiently predict nearly innumerable blocks occurring in video content. Prediction errors may be larger at the edges of the prediction blocks, resulting in more bits needed to compress. Although, linear interpolation of the samples using the intermediate prediction block and the boundary samples to generate the remaining samples, not all the boundary samples are used for the interpolation function. As shown in FIG. 14, the final predicted block pred is generated from the intermediate predicted samples, one boundary that is downsampled (the top in the example of FIG. 14) and one boundary without any modifications. This affects the prediction accuracy.

As used in this disclosure, "edge samples of a block" generally refer to the samples in the block that are adjacent to one of the four boundaries of the block, such as the samples in the first and last rows of the block and the samples in the first and last column of the block. As used in this disclosure, top, left, bottom and right edge samples of a block generally refer to the samples in the block that are adjacent to the top, left, bottom and right boundaries of the block, respectively. Note that the top-left corner sample of the block may be considered as both top edge sample as well as left edge samples. It is to be understood that in some examples, the top-left corner sample may be considered to be a top edge sample and not a left edge sample; whereas in other examples, the top-left corner sample may be considered to be a left edge sample and not a top edge sample. Similar considerations may apply to top-right, bottom-right and bottom-left corner samples of the block.

As used in this disclosure, an edge band of samples of a block generally refers to the samples in the block that are in the neighborhood of any of the four boundaries of the block, e.g., samples in the first or last few rows of the block or the first or last few columns of the block. Similar definitions may also be defined for top, left, right and bottom edge band of samples of a block. As used in this disclosure, an n-top edge band of samples of a block generally refers to the samples belonging to the top n rows of the block, and an n-bottom edge band of samples of a block is defined as the samples belonging to the bottom n rows of the block. An n-left edge band of samples of a block is defined as the samples belonging to the left n columns of the block, and an n-right edge band of samples of a block is defined as the samples belonging to the right n columns of the block. In these examples, n will be an integer.

Figure 15:
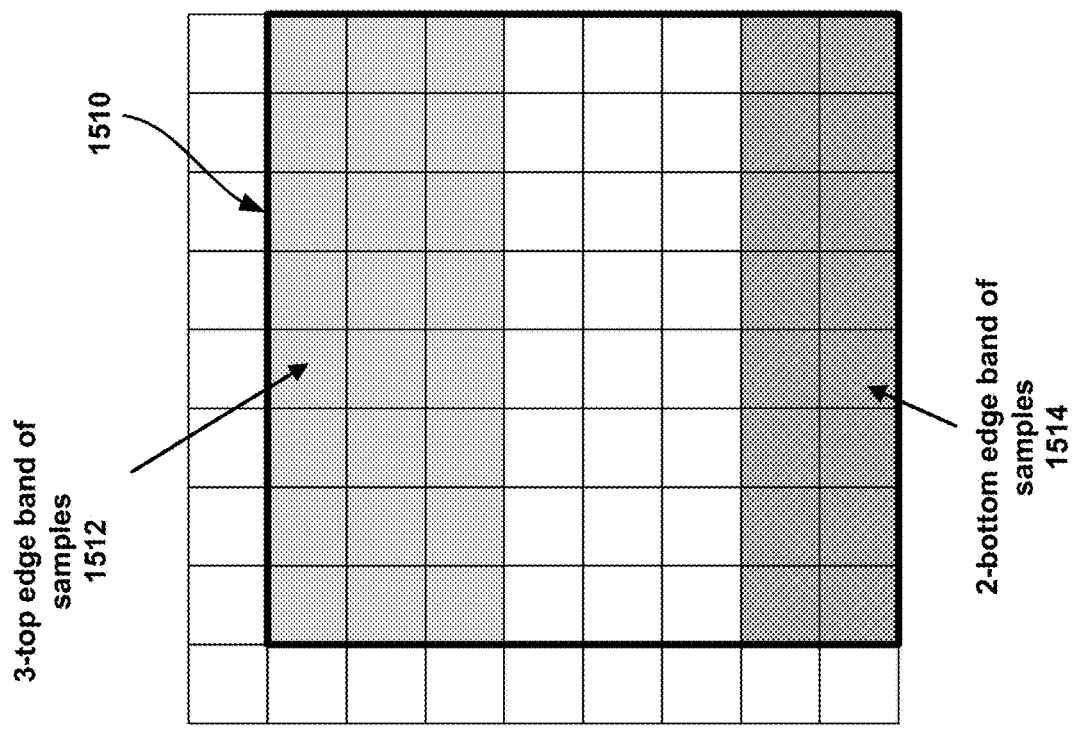
FIG. 15 illustrates some examples of types of boundary bands.
Figure 15:
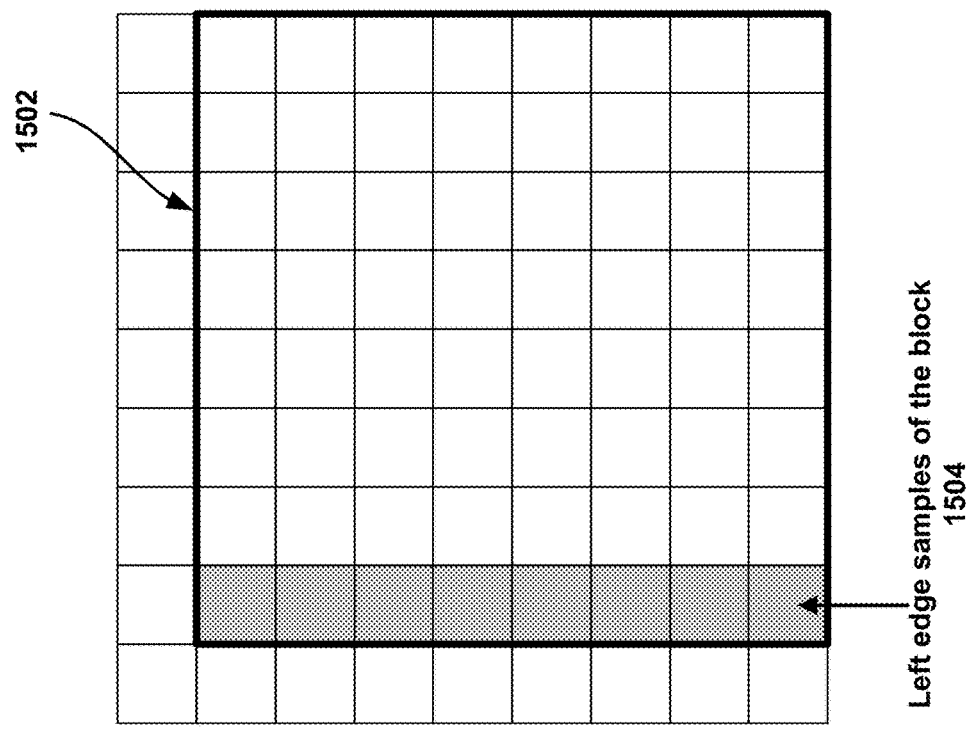

FIG. 15 illustrates some examples of the boundary bands defined above. For example, block 1502 (shown by the bolded black line) includes left edge samples 1504, shown in gray. Block 1506 (shown by the bolded black line) includes 3-top edge band of samples 1512 and 2-bottom edge band of samples 1514.

This disclosure describes techniques that may improve the efficiency of ALWIP. The following described techniques may be used separately or in combination.

In some example, the upsampling process described above may be modified such that the prediction error of the samples may be reduced. For example, video encoder 200 and video decoder 300 may be configured to perform an additional filtering stage to reduce the prediction error. In some examples, this additional filtering stage may effectively be incorporated into the interpolation or upsampling stage, such that the additional filtering is part of, rather than separate from, the interpolation or upsampling stage. In other examples, the additional filtering may be performed in lieu the interpolation or upsampling stage, In some examples, video encoder 200 and video decoder 300 may be configured to perform, after the linear interpolation is applied in one or both directions to generate the prediction samples, a further filtering on the top and the left edge samples. For example, a filter F1 may be applied on the top edge samples in the vertical direction and a filter F2 may be applied on the left edge samples in the horizontal direction. Video encoder 200 and video decoder 300 may be configured to use all the boundary reference samples in the additional filter stage. In some examples, video encoder 200 and video decoder 300 may configured to apply a different downsampling filter to the boundary samples to generate a set of reduced boundary reference samples for the additional filter stage.

Video encoder 200 and video decoder 300 may be configured to select the filters F1 and F2 from a set of filters that may be signaled or pre-determined. A non-exhaustive set of coefficients of such filters is as follows:

1. [1 2 1]
2. [1]
3. [1 2 2 2 1]
4. [1 4 6 4 1]
5. [1 3]

In the example above, a filter of [1] may effectively be a "copy" filter that copies, without averaging, a sample value to which the filter is applied. By contrast, a [1 1 1 1] filter may represent an averaging filtering. Filters with other values may represent weighted averaging filters. Filters 1-4 above are symmetrical filters, such that the middle coefficient (e.g., 2 in filter 1, 6 in filter 4, etc.) are applied to the sample being filtered.

In some examples, the filter F1 and F2 may not be the same. In other examples, video encoder 200 and video decoder 300 may select the filter based on the upsampling factors used in the upsampling process of ALWIP. In some examples, video encoder 200 and video decoder 300 may apply the additional filter stage to the top edge samples of the block only when the upsampling factor is more than 1 in the horizontal direction. In some examples, video encoder 200 and video decoder 300 may apply the additional filter stage to the left edge samples of the block only when the upsampling factor is more than 1 in the vertical direction.

Figure 16:
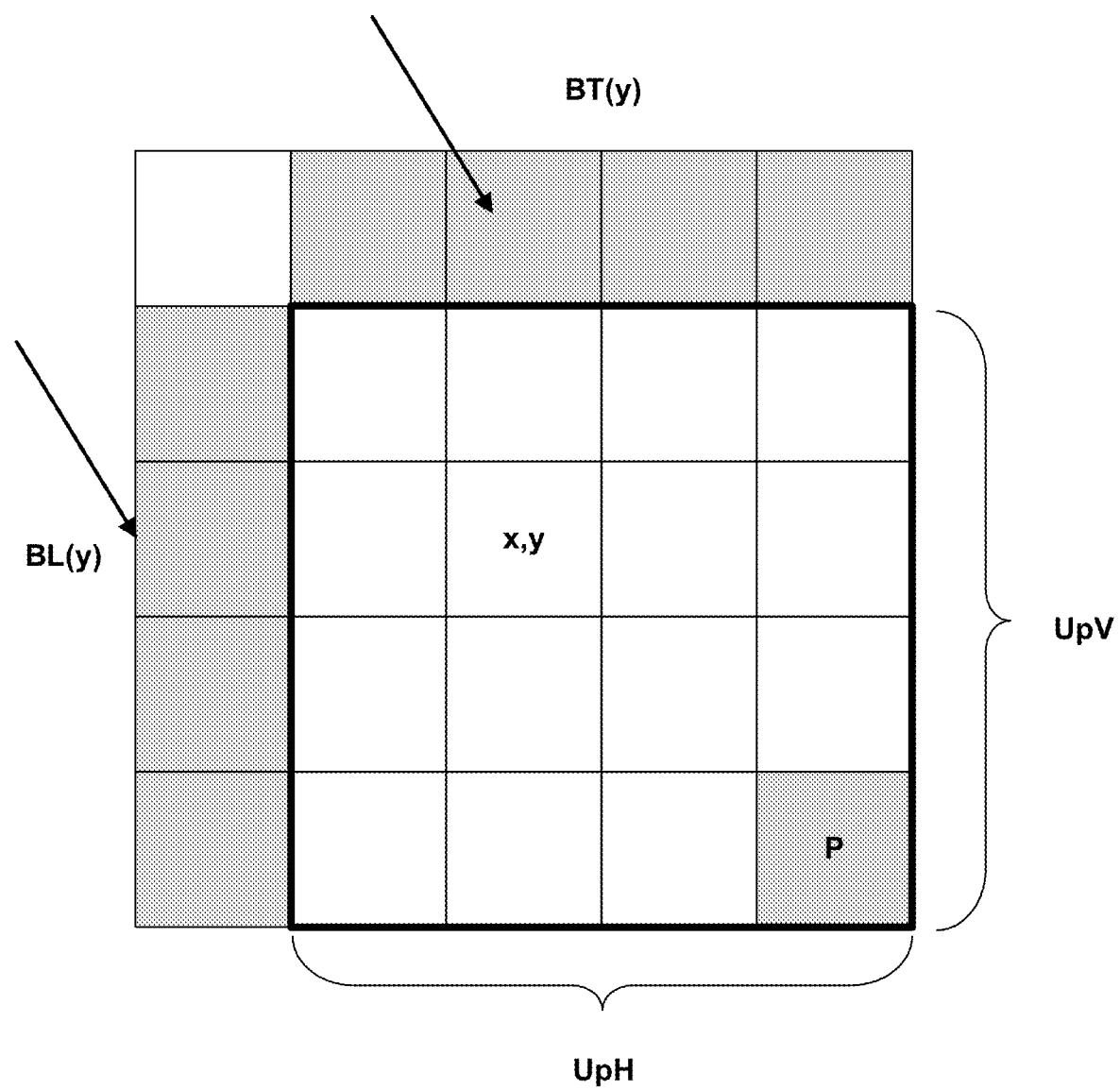
FIG. 16 shows an example of boundary reference samples.

In some examples, the additional filter stage may be performed similar to the PDPC operations, where the predicted samples are updated with a weighted average of the prediction and the boundary samples FIG. 16 shows an example where the boundary reference samples are used without downsampling and the there is one intermediate predicted samples value in the bottom right. UpV and UpH indicate the upsampling factors in the vertical and the horizontal directions.

In this example, let pred(x,y) be the prediction obtained as a result of the ALWIP linear interpolation. The additional stage modifies the pred(x,y) as follows.

$$Pred(x,y)=(wT*BT(x)+wL*BL(y)+(64-wT-wL)*Pred(x,y)+32)>>6$$

Note that the values of 32 and 64 above chosen based on the precision of the values wL and wT, and may be different for different precisions of wT and wL. In this example, it is assumed that the value of wT and wL are in the range of 0 to 64; in some cases, wT, wL and 64−wT−wT are restricted to be non-negative. The weights may be derived as follows:

$$wT=32>>((y<<1)>>\text{shift}), wL=32>>((x<<1)>>\text{shift})$$

where the value of shift may be fixed or be derived using the block width and height; e.g., as shift=(log$_2$(width)+log$_2$(height)+2)>>2, In some cases, the value of the predicted samples corresponding to the intermediate predicted positions (e.g., P in FIG. 16) are not modified.

When the modifying samples in other parts of the block, only the left or the top boundary samples may be used for additional filter stage. E.g, for a sample (x,y) with respect to the top left sample of the block, when value of x is greater than or equal to a threshold value (e.g. UpH), the value of wL may be set equal to 0; similarly when the value of y is greater than or equal to a threshold value (e.g., UpV), the value of wT may be set equal to 0.

In some examples, the additional filter stage is only applied to modify the value of samples position in n1-top edge samples and n2-left edge samples of the block, where the value of n1 and n2 may be determined by the upsampling factor for ALWIP in the block (e.g., n1 may be equal to UpV−1 and n2 may be equal to UpH−1, where UpV and UpH are the upsampling factors in the vertical and horizontal directions, respectively.

In some examples, the upsampling process is modified such that samples are predicted using position dependent weights—or in other words, the linear interpolation and the additional stage operation is combined in one step.

The prediction of all samples in the block could be generalized as follows:

When (x,y) does not belong to an intermediate predicted samples, the value pred(x,y) is determined as follows (x and y are with respect to the sample to the bottom right of P3):

$$Pred(x,y)=(w1*P1+w2*P2+w3*P3+w4*P4+wL*L+wT*T+\text{offset})>>\text{shift}$$

Where the value of offset and shifts are chosen to normalize the predicted samples values and values are set as follows: w1=x*y, w2=(UpH−1−x)*y, w3=(UpH−1−x)*(UpV−1−y), w4=x*(UpH−1−y) and wL and wT are determined based on equations similar to PDPC, with the following exceptions:

When L and T belong to a boundary reference, the w2, w3 and w4 are set equal to 0.
Else if L doesn't belong to a boundary and T belongs to a boundary, wL, w3 and w4 are set equal to 0.
Else if L belongs to a boundary and T does not belong to a boundary, wT, w3 and w2 are set equal to 0.
Else wL and wT are set equal to 0.

Figure 17:
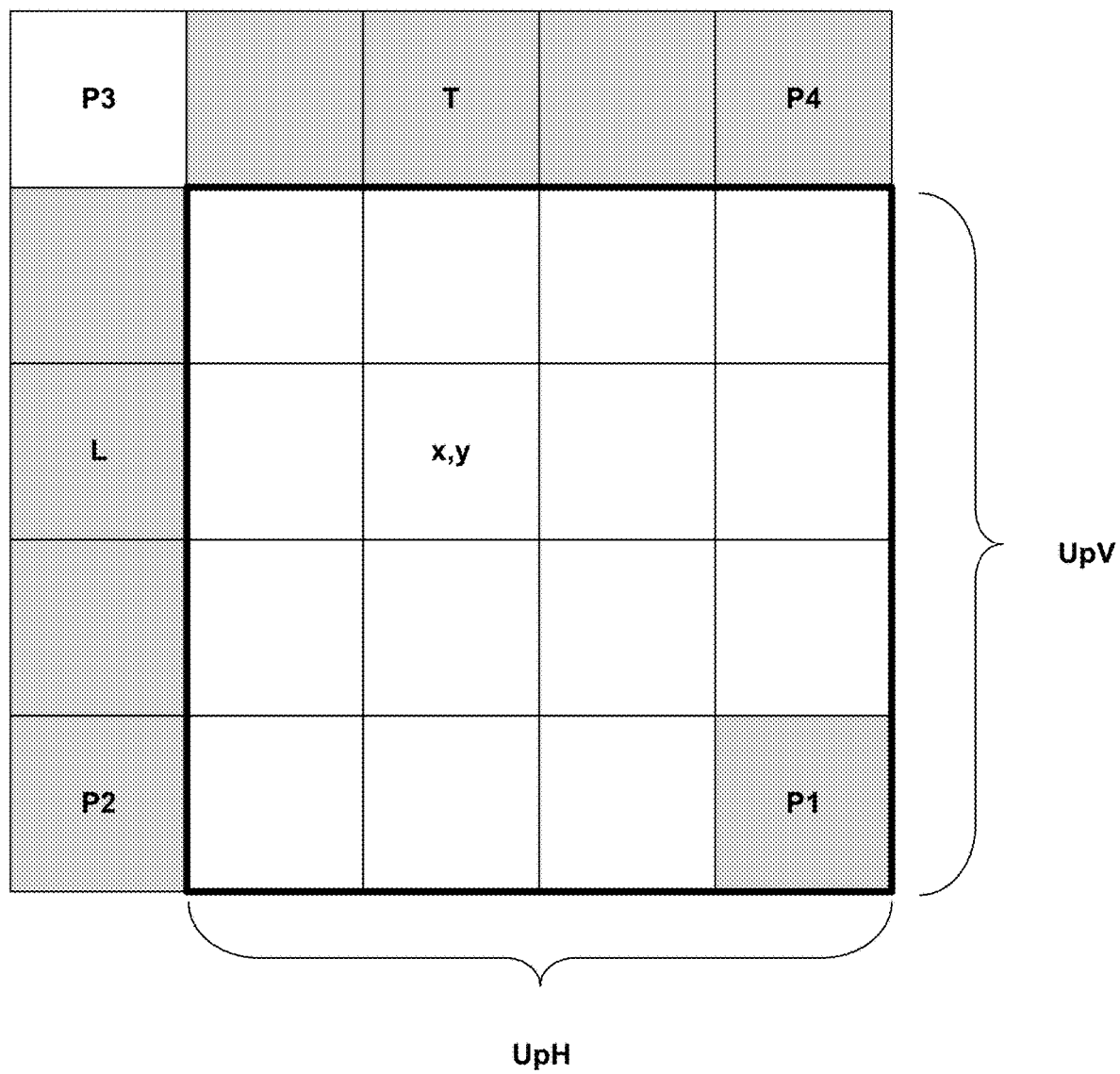
FIG. 17 shows an example derivation for a sample.

In some examples the value of predicted samples are derived similar to the derivation of Planar prediction; E.g., in FIG. 17, the samples value at x,y is derived using a derivation similar to planar prediction—by deriving a horizonal prediction from L (or P2 and P3), P4 and P1, and deriving a vertical prediction from T (or P3 and P4), P1 and P2.

Note that the value of w1, w2, w3, w4, wL and wT are only illustrated as examples, and other values of these weights may be chosen.

In some examples, when position dependent weights are used for modified upsampling process, the choice of the weights may be based on the particular mode/matrix that is used with ALWIP. In some cases, a mapping table may be used to interpret an intra prediction mode that corresponds to a particular matrix. The position dependent weights may be chosen based on the interpreted intra prediction mode, and one or more boundary reference sample may be used to compute the predicted value. In some case, a default set of weights may be used for the position dependent weights independent of the matrix that is used. In some examples, the position dependent weights may also depend on other characteristics including but not limited to block shape (width, height), aspect ratio etc.

Figure 18:
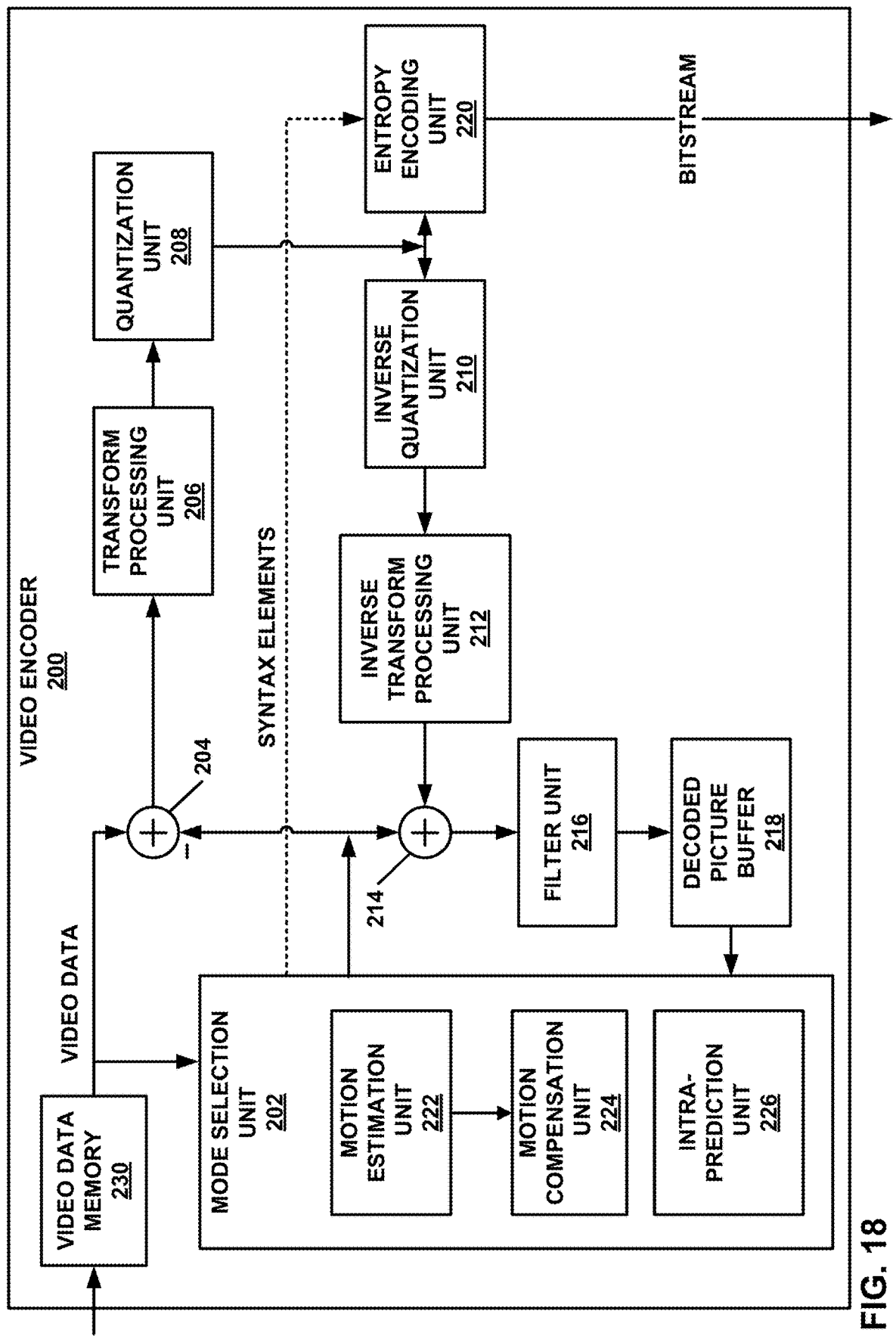
FIG. 18 is a block diagram illustrating an example video encoder that may perform the techniques of this disclosure.

FIG. 18 is a block diagram illustrating an example video encoder 200 that may perform the techniques of this disclosure. FIG. 18 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 18, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 18 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block. As another example, for an ALWIP mode, intra prediction unit 226 may derive, based on a set of left edge neighboring samples of the current block and a set of top edge neighboring samples of the current block, a subset of left edge samples and a subset of top edge samples; apply an affine model to the subset of left edge samples and the subset of top edge samples to generate an intermediate block of intermediate samples; and filter, using the set of left edge neighboring samples and the set of top edge neighboring samples of the current block, the intermediate samples to generate a final prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry and configured to perform the techniques of this disclosure, including the techniques for upsampling in affine linear weighted intra prediction.

Figure 19:
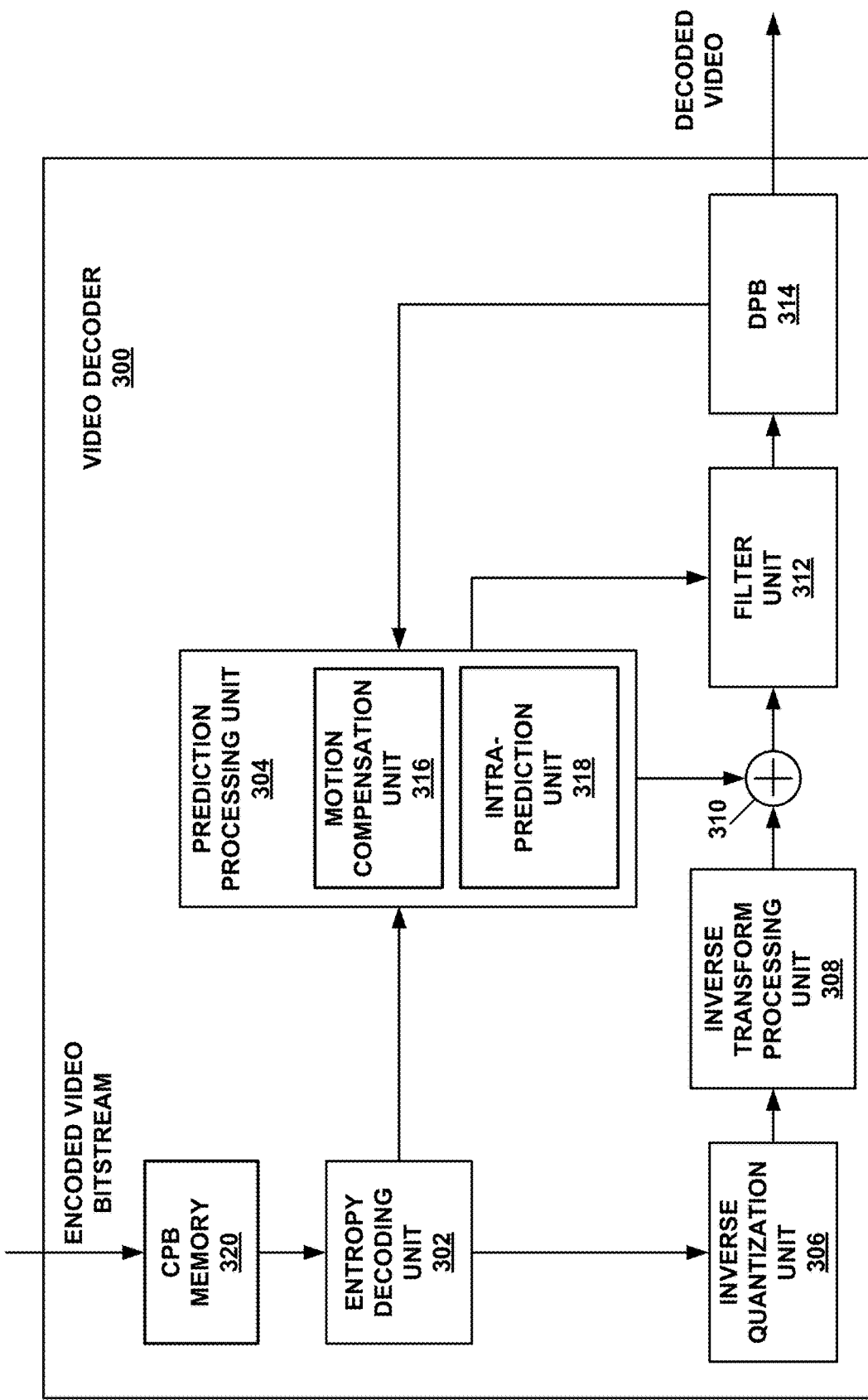
FIG. 19 is a block diagram illustrating an example video decoder that may perform the techniques of this disclosure.

FIG. 19 is a block diagram illustrating an example video decoder 300 that may perform the techniques of this disclosure. FIG. 19 is provided for purposes of explanation and is not limiting on the techniques as broadly exemplified and described in this disclosure. For purposes of explanation, this disclosure describes video decoder 300 is described according to the techniques of JEM and HEVC. However, the techniques of this disclosure may be performed by video coding devices that are configured to other video coding standards.

In the example of FIG. 19, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 19 are illustrated to assist with understanding the operations performed by video decoder 300. The units may be implemented as fixed-function circuits, programmable circuits, or a combination thereof. Similar to FIG. 18, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 18).

As another example, if the prediction information syntax elements indicate that the current block is intra-predicted, intra-prediction unit 318 may generate the prediction block according to an intra-prediction mode indicated by the prediction information syntax elements. As another example, if the prediction information syntax elements indicate that the current block is intra-predicted in an ALWIP mode, then intra prediction unit 318 may derive, based on a set of left edge neighboring samples of the current block and a set of top edge neighboring samples of the current block, a subset of left edge samples and a subset of top edge samples; apply an affine model to the subset of left edge samples and the subset of top edge samples to generate an intermediate block of intermediate samples; and filter, using the set of left edge neighboring samples and the set of top edge neighboring samples of the current block, the intermediate samples to generate a final prediction block. Again, intra-prediction unit 318 may generally perform the intra-prediction process in a manner that is substantially similar to that described with respect to intra-prediction unit 226 (FIG. 18). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to perform the techniques of this disclosure, including the techniques for upsampling in affine linear weighted intra prediction.

Figure 20:
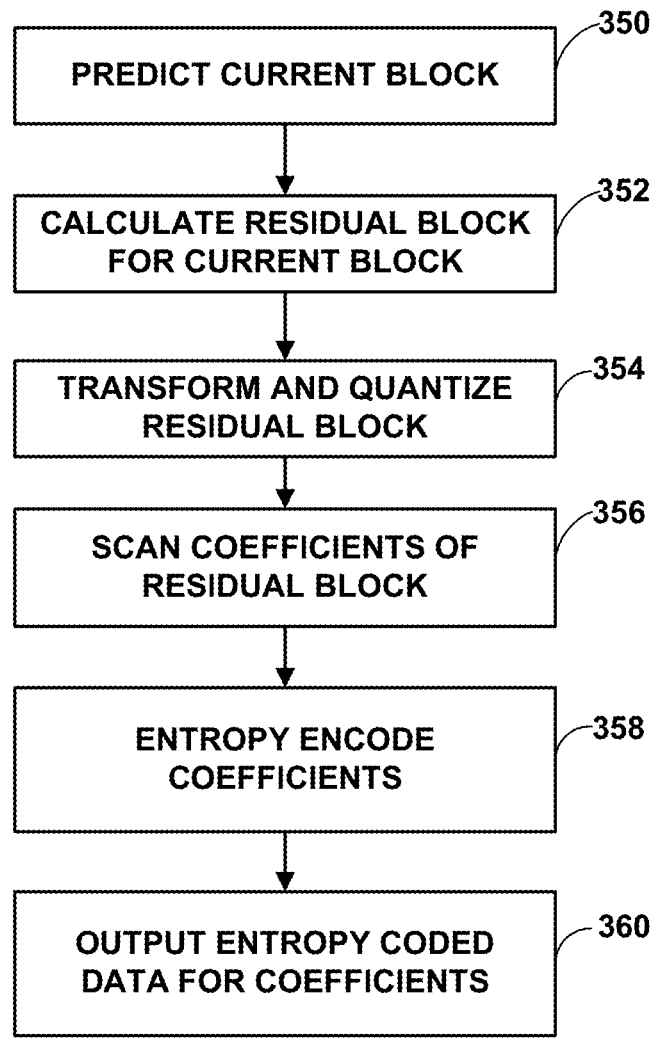
FIG. 20 is a flowchart illustrating an example video encoding process.

FIG. 20 is a flowchart illustrating an example process for encoding a current block. The current block may include a current CU. Although described with respect to video encoder 200 (FIGS. 1 and 18), it should be understood that other devices may be configured to perform a method similar to that of FIG. 20.

In this example, video encoder 200 initially predicts the current block (350). For example, video encoder 200 may form a prediction block for the current block using any of the intra prediction techniques described in this disclosure. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 21:
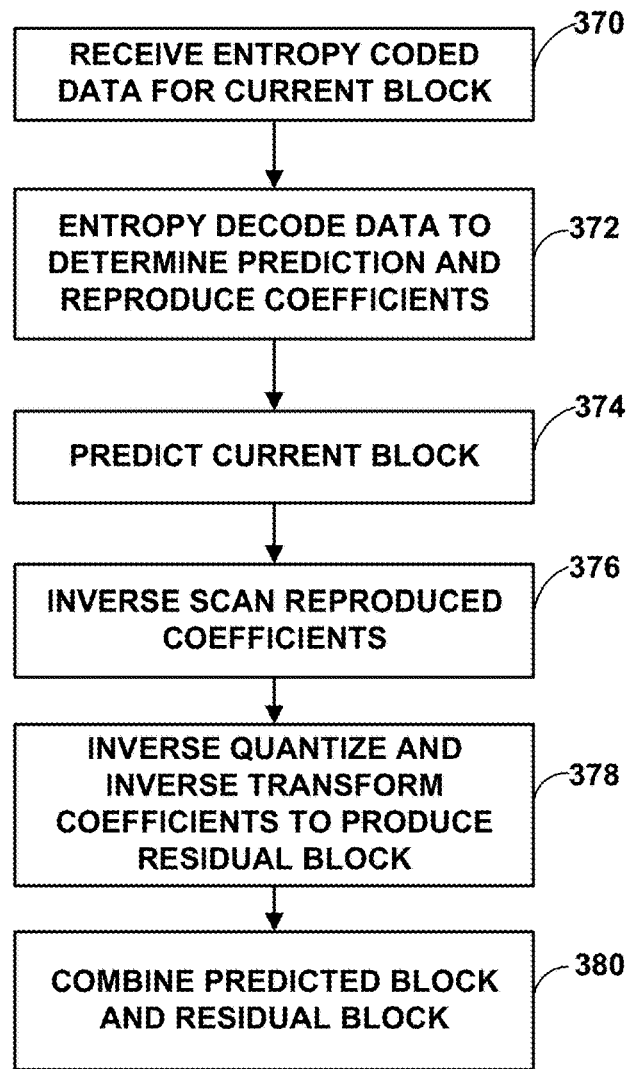
FIG. 21 is a flowchart illustrating an example video decoding process.

FIG. 21 is a flowchart illustrating an example process for decoding a current block of video data. The current block may include a current CU. Although described with respect to video decoder 300 (FIGS. 1 and 19), it should be understood that other devices may be configured to perform a method similar to that of FIG. 21.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may, for example, predict the current block using any of the intra prediction techniques described in this disclosure. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

Figure 22:
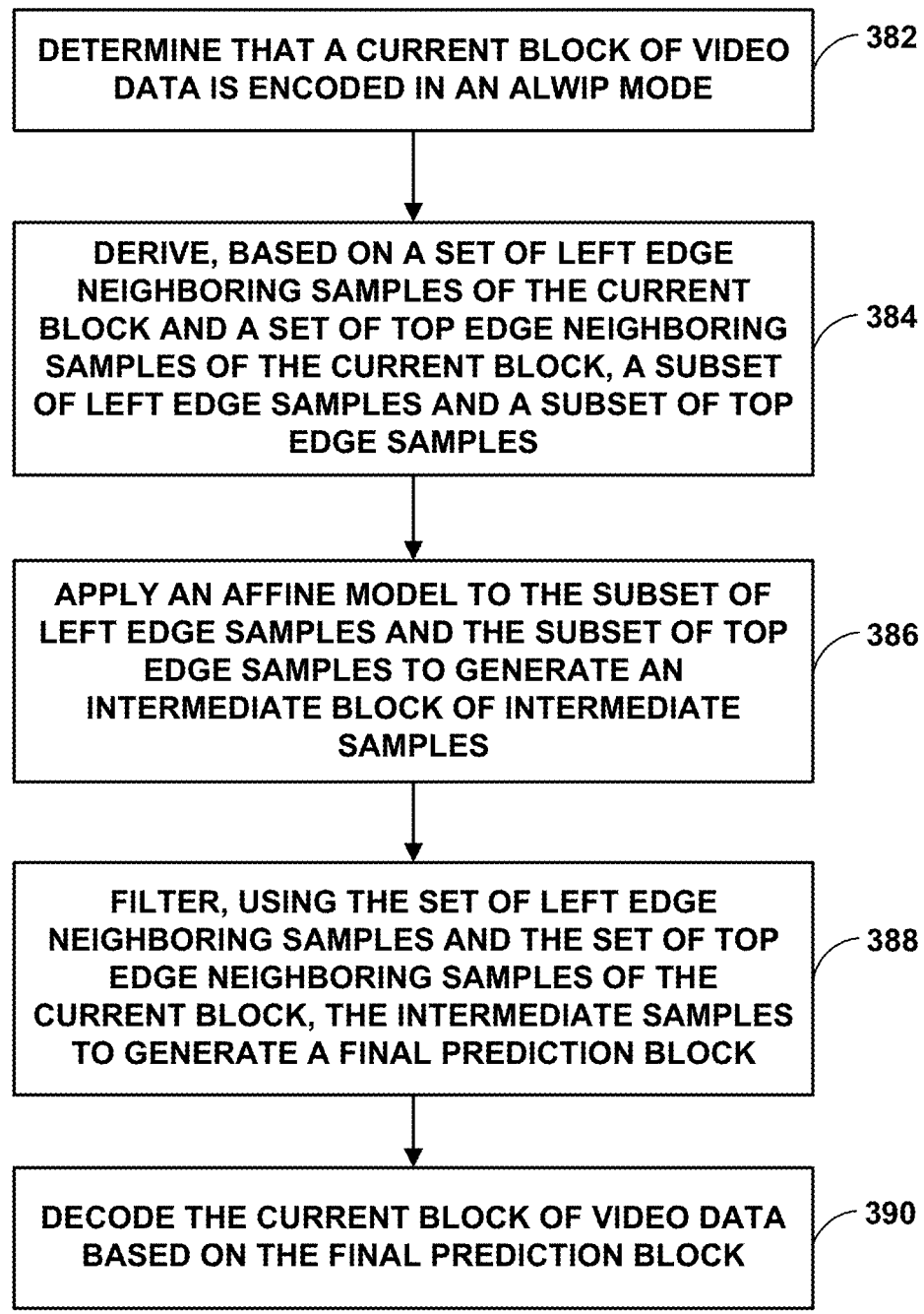
FIG. 22 is a flowchart illustrating an example video decoding process.

FIG. 22 is a flowchart illustrating an example process for decoding a current block of video data. The current block may include a current CU. Although described with respect to video decoder 300 (FIGS. 1 and 19), it should be understood that other devices may be configured to perform a method similar to that of FIG. 22. For example, the decoding loop of video encoder 200 (FIGS. 1 and 18), may also perform the techniques of FIG. 22.

In the example of FIG. 22, video decoder 300 determines that a current block of video data is encoded in an ALWIP mode (382). Video decoder 300 derives, based on a set of left edge neighboring samples of the current block and a set of top edge neighboring samples of the current block, a subset of left edge samples and a subset of top edge samples (384). Video decoder 300 may, for example, derive the subset of left edge samples by downsampling, using averaging, the set of left edge neighboring samples and derive the subset of top edge samples by downsampling, using averaging, the set of top edge neighboring samples.

The set of top edge neighboring samples may, for example, have N total samples and the subset of top edge samples may have a total of N/2 samples, where N is an integer representing a number of columns included in the current block. The set of left edge neighboring samples may, for example, have N total samples and the subset of left edge samples may have a total of N/2 samples, where N is an integer representing a number of rows included in the current block. In one example, the current block may be an N×M block of samples, where N is an integer value representing a number of columns in the current block and a number of samples in the set of top edge samples and M is an integer value representing a number of rows in the current block and a number of samples in the set of left edge samples. N and M may or may not be equal. The set of left edge samples may have M/2 samples, and the set of top edge samples may have N/2 samples.

Video decoder 300 applies an affine model to the subset of left edge samples and the subset of top edge samples to generate an intermediate block of intermediate samples (386). To apply the affine model to the subset of left edge samples and the subset of top edge samples to generate the intermediate block of intermediate samples, video decoder 300 may, for example, multiplying the subset of left edge samples and the subset of top edge samples by a matrix and a bias vector.

Video decoder 300 filters, using the set of left edge neighboring samples and the set of top edge neighboring samples of the current block, the intermediate samples to generate a final prediction block (388). To filter the intermediate samples to generate the final prediction block, video decoder 300 may, for example, upsample the intermediate samples using a second subset of left edge samples that is different than the subset of left edge samples and a second subset of top edge samples that is different than the subset of top edge samples. Video decoder 300 may, for example, upsample the intermediate samples based on actual sample values in the set of top edge samples or set of left edge samples, as opposed to sample values from the subset of top edge samples or subset of left edge samples, where the subsets are obtained by averaging and are different than the sets. To filter the intermediate samples to generate a final prediction block, video decoder 300 may apply one or more filters in a vertical direction and one or more filters in a horizontal direction. To apply the one or more filters in the vertical direction, video decoder 300 may use samples of the set of top edge samples to perform linear interpolation in the vertical direction. That is, if the subset of top edge samples includes M/2 samples, then video decoder 300 may use a different subset of the M top edge samples when applying the one or more filters in the vertical direction. The samples used for interpolation may be actual samples of the M top edge samples instead of samples determined from averaging. As part of applying the one or more filters in the vertical direction, video decoder 300 may comprises applying position dependent weights to at least some of the M samples of the set of top edge samples.

Video decoder 300 decodes the current block of video data based on the final prediction block (390). To decode the current block of video data based on the final prediction block, video decoder 300 may determine residual values for the current block of video data; add the residual values to the filtered prediction block to determine a reconstructed block for the current block of video data; and apply one or more filters to the reconstructed block to generate a decoded block of video data. Video decoder 300 may then output, for display and/or storage, a picture that includes the decoded block of video data. Video decoder 300 may, for instance, store a copy of the picture for use in decoding other pictures of the video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining that a current block of video data is encoded in a matrix intra prediction mode;
    deriving, based on a set of left edge neighboring samples of the current block and a set of top edge neighboring samples of the current block, a set of downsampled left edge samples and a set of downsampled top edge samples, wherein the set of downsampled left edge samples includes fewer samples than the set of left edge neighboring samples and the set of downsampled top edge samples includes fewer samples than the set of top edge neighboring samples;
    applying an affine model to the set of downsampled left edge samples and the set of downsampled top edge samples to generate a first set of prediction samples;
    interpolating a second set of prediction samples based on the first set of prediction samples, a subset of the set of left edge neighboring samples, and a subset of the set of top edge neighboring samples, wherein the subset of the set of left edge neighboring samples includes different samples than the set of downsampled left edge samples and the subset of the set of top edge neighboring samples includes different samples than the set of downsampled top edge samples;
    generating a final prediction block, wherein the final prediction block comprises the first set of prediction samples and the second set of prediction samples; and
    decoding the current block of video data based on the final prediction block.

2. The method of claim 1, wherein:
    each sample of the set of downsampled left edge samples comprises an average of two or more samples of the set of left edge neighboring samples; and
    each sample of the set of downsampled top edge samples comprises an average of two or more samples of the set of top edge neighboring samples.

3. The method of claim 1, wherein applying the affine model to the set of downsampled left edge samples and the set of downsampled top edge samples to generate the first set of prediction samples comprises multiplying the set of downsampled left edge samples and the set of downsampled top edge samples by a matrix.

4. The method of claim 1, wherein the set of top edge neighboring samples has N total samples and the set of downsampled top edge samples has a total of N/2 samples, wherein N is an integer representing a number of columns included in the current block.

5. The method of claim 1, wherein the set of left edge neighboring samples has N total samples and the set of downsampled left edge samples has a total of N/2 samples, wherein N is an integer representing a number of rows included in the current block.

6. The method of claim 1, wherein:
    the current block is an N×M block of samples, N is an integer value representing a number of columns in the current block and a number of samples in the set of top edge neighboring samples, and M is an integer value representing a number of rows in the current block and a number of samples in the set of left edge neighboring samples; and
    the set of downsampled left edge samples has M/2 samples, the set of downsampled top edge samples has N/2 samples, the set of left edge neighboring samples has M samples, and set of top edge neighboring samples has N samples.

7. The method of claim 6, wherein interpolating the second set of prediction samples comprises applying one or more filters in a vertical direction to the first set of prediction samples and the set of downsampled top edge samples.

8. The method of claim 7, wherein applying the one or more filters in the vertical direction includes using samples of the set of top edge neighboring samples to perform linear interpolation in the vertical direction.

9. The method of claim 7, wherein applying the one or more filters in the vertical direction comprises applying position dependent weights to at least some of the N samples of the set of top edge neighboring samples.

10. The method of claim 1, wherein decoding the current block of video data based on the final prediction block comprises:
    determining residual values for the current block of video data;
    adding the residual values to the filtered prediction block to determine a reconstructed block for the current block of video data; and
    applying one or more filters to the reconstructed block to generate a decoded block of video data.

11. The method of claim 1, wherein the method is performed as part of a video encoding process.

12. A device for decoding video data, the device comprising:
    a memory configured to store video data; and
    one or more processors implemented in circuitry and configured to:
        determine that a current block of video data is encoded in a matrix intra prediction mode;
        derive, based on a set of left edge neighboring samples of the current block and a set of top edge neighboring samples of the current block, a set of downsampled left edge samples and a set of downsampled top edge samples, wherein the set of downsampled left edge samples includes fewer samples than the set of left edge neighboring samples and the set of downsampled top edge samples includes fewer samples than the set of top edge neighboring samples;
        apply an affine model to the set of downsampled left edge samples and the set of downsampled top edge samples to generate a first set of prediction samples;
        interpolate a second set of prediction samples based on the first set of prediction samples, a subset of the set of left edge neighboring samples, and a subset of the set of top edge neighboring samples, wherein the subset of the set of left edge neighboring samples includes different samples than the set of downsampled left edge samples and the subset of the set of top edge neighboring samples includes different samples than the set of downsampled top edge samples;

generate a final prediction block, wherein the final prediction block comprises the first set of prediction samples and the second set of prediction samples; and decode the current block of video data based on the final prediction block.

13. The device of claim 12, wherein:

each sample of the set of downsampled left edge samples comprises an average of two or more samples of the set of left edge neighboring samples; and each sample of the set of downsampled top edge samples comprises an average of two or more samples of the set of top edge neighboring samples.

14. The device of claim 12, wherein to apply the affine model to the set of downsampled left edge samples and the set of downsampled top edge samples to generate the first set of prediction, the one or more processors are further configured to multiply the set of downsampled left edge samples and the set of downsampled top edge samples by a matrix.

15. The device of claim 12, wherein the set of top edge neighboring samples has N total samples and the set of downsampled top edge samples has a total of N/2 samples, wherein N is an integer representing a number of columns included in the current block.

16. The device of claim 12, wherein the set of left edge neighboring samples has N total samples and the set of downsampled left edge samples has a total of N/2 samples, wherein N is an integer representing a number of rows included in the current block.

17. The device of claim 12, wherein:

the current block is an N×M block of samples, N is an integer value representing a number of columns in the current block and a number of samples in the set of top edge neighboring samples, and M is an integer value representing a number of rows in the current block and a number of samples in the set of left edge neighboring samples;

the set of downsampled left edge samples has M/2 samples, the set of downsampled top edge samples has N/2 samples, the set of left edge neighboring samples has M samples, and set of top edge neighboring samples has N samples.

18. The device of claim 17, wherein to interpolate the second set of prediction samples, the one or more processors are further configured to apply one or more filters in a vertical direction to the first set of prediction samples and the set of top edge neighboring samples.

19. The device of claim 18, wherein to apply the one or more filters in the vertical direction, the one or more processors are further configured to use samples of the set of top edge neighboring samples to perform linear interpolation in the vertical direction.

20. The device of claim 18, wherein to apply the one or more filters in the vertical direction, the one or more processors are further configured to apply position dependent weights to at least some of the N samples of the set of top edge neighboring samples.

21. The device of claim 12, wherein to decode the current block of video data based on the final prediction block, the one or more processors are further configured to:

determine residual values for the current block of video data;

add the residual values to the filtered prediction block to determine a reconstructed block for the current block of video data; and apply one or more filters to the reconstructed block to generate a decoded block of video data.

22. The device of claim 12, wherein the device comprises a wireless communication device, further comprising a receiver configured to receive encoded video data.

23. The device of claim 22, wherein the wireless communication device comprises a telephone handset and wherein the receiver is configured to demodulate, according to a wireless communication standard, a signal comprising the encoded video data.

24. The device of claim 12, wherein the device comprises a wireless communication device, further comprising a transmitter configured to transmit encoded video data.

25. The device of claim 24, wherein the wireless communication device comprises a telephone handset and wherein the transmitter is configured to modulate, according to a wireless communication standard, a signal comprising the encoded video data.

26. A non-transitory computer-readable storage medium storing instructions that when executed by one or more processors cause the one or more processor to:

determine that a current block of video data is encoded in a matrix intra prediction mode;

derive, based on a set of left edge neighboring samples of the current block and a set of top edge neighboring samples of the current block, a set of downsampled left edge samples and a set of downsampled top edge samples, wherein the set of downsampled left edge samples includes fewer samples than the set of left edge neighboring samples and the set of downsampled top edge samples includes fewer samples than the set of top edge neighboring samples;

apply an affine model to the set of downsampled left edge samples and the set of downsampled top edge samples to generate a first set of prediction samples;

interpolate a second set of prediction samples based on the first set of prediction samples, a subset of the set of left edge neighboring samples, and a subset of the set of top edge neighboring samples, wherein the subset of the set of left edge neighboring samples includes different samples than the set of downsampled left edge samples and the subset of the set of top edge neighboring samples includes different samples than the set of downsampled top edge samples;

generate a final prediction block, wherein the final prediction block comprises the first set of prediction samples and the second set of prediction samples; and decode the current block of video data based on the final prediction block.

27. The non-transitory computer-readable storage medium of claim 26, wherein:

each sample of the set of downsampled left edge samples comprises an average of two or more samples of the set of left edge neighboring samples; and each sample of the set of downsampled top edge samples comprises an average of two or more samples of the set of top edge neighboring samples.

28. The non-transitory computer-readable storage medium of claim 26, wherein to apply the affine model to the set of downsampled left edge samples and the set of downsampled top edge samples to generate the first set of prediction samples, the instructions cause the one or more processors to multiply the set of downsampled left edge samples and the set of downsampled top edge samples by a matrix.

29. The non-transitory computer-readable storage medium of claim 26, wherein the set of top edge neighboring samples has N total samples and the set of downsampled top edge samples has a total of N/2 samples, wherein N is an integer representing a number of columns included in the current block.

30. The non-transitory computer-readable storage medium of claim 26, wherein the set of left edge neighboring samples has N total samples and the set of downsampled left edge samples has a total of N/2 samples, wherein N is an integer representing a number of rows included in the current block.

31. The non-transitory computer-readable storage medium of claim 26, wherein:
the current block is an N×M block of samples, N is an integer value representing a number of columns in the current block and a number of samples in the set of top edge neighboring samples, and M is an integer value representing a number of rows in the current block and a number of samples in the set of left edge neighboring samples;
the set of downsampled left edge samples has M/2 samples, the set of downsampled top edge samples has N/2 samples, the set of left edge neighboring samples has M samples, and set of top edge neighboring samples has N samples.

32. The non-transitory computer-readable storage medium of claim 31, wherein to interpolate the second set of prediction samples, the instructions cause the one or more processors to apply one or more filters in a vertical direction to the first set of prediction samples and the set of top edge neighboring samples.

33. The non-transitory computer-readable storage medium of claim 32, wherein to apply the one or more filters in the vertical direction, the instructions cause the one or more processors to use samples of the set of top edge neighboring samples to perform linear interpolation in the vertical direction.

34. The non-transitory computer-readable storage medium of claim 32, wherein to apply the one or more filters in the vertical direction, the instructions cause the one or more processors to apply position dependent weights to at least some of the N samples of the set of top edge neighboring samples.

35. The non-transitory computer-readable storage medium of claim 26, wherein to decode the current block of video data based on the final prediction block, the instructions cause the one or more processors to:
determine residual values for the current block of video data;
add the residual values to the filtered prediction block to determine a reconstructed block for the current block of video data; and
apply one or more filters to the reconstructed block to generate a decoded block of video data.

36. An apparatus for decoding video data, the apparatus comprising:
means for determining that a current block of video data is encoded in a matrix intra prediction mode;
means for deriving, based on a set of left edge neighboring samples of the current block and a set of top edge neighboring samples of the current block, a set of downsampled left edge samples and a set of downsampled top edge samples, wherein the set of downsampled left edge samples includes fewer samples than the set of left edge neighboring samples and the set of downsampled top edge samples includes fewer samples than the set of top edge neighboring samples;
means for applying an affine model to the set of downsampled left edge samples and the set of downsampled top edge samples to generate a first set of prediction samples;
means for interpolating a second set of prediction samples based on the first set of prediction samples, the set of left edge neighboring samples, and the set of top edge neighboring samples, wherein the subset of the set of left edge neighboring samples includes different samples than the set of downsampled left edge samples and the subset of the set of top edge neighboring samples includes different samples than the set of downsampled top edge samples;
means for generating a final prediction block, wherein the final prediction block comprises the first set of prediction samples and the second set of prediction samples; and
means for decoding the current block of video data based on the final prediction block.

37. The apparatus of claim 36, wherein:
the means for deriving the set of downsampled left edge samples comprises means for downsampling the set of left edge neighboring samples, wherein each sample of the set of downsampled left edge samples comprises an average of two or more samples of the set of left edge neighboring samples; and
the means for deriving the set of downsampled top edge samples comprises means for downsampling the set of top edge neighboring samples, wherein each sample of the set of downsampled top edge samples comprises an average of two or more samples of the set of top edge neighboring samples.

38. The apparatus of claim 36, wherein the means for applying the affine model to the set of downsampled left edge samples and the set of downsampled top edge samples to generate the first set of prediction samples comprises means for multiplying the set of downsampled left edge samples and the set of downsampled top edge samples by a matrix.

39. The apparatus of claim 36, wherein the set of top edge neighboring samples has N total samples and the set of downsampled top edge samples has a total of N/2 samples, wherein N is an integer representing a number of columns included in the current block.

40. The apparatus of claim 36, wherein the set of left edge neighboring samples has N total samples and the set of downsampled left edge samples has a total of N/2 samples, wherein N is an integer representing a number of rows included in the current block.

41. The apparatus of claim 36, wherein:
the current block is an N×M block of samples, N is an integer value representing a number of columns in the current block and a number of samples in the set of top edge neighboring samples, and M is an integer value representing a number of rows in the current block and a number of samples in the set of left edge neighboring samples; and
the set of downsampled left edge samples has M/2 samples, the set of downsampled top edge samples has N/2 samples, the set of left edge neighboring samples has M samples, and set of top edge neighboring samples has N samples.

42. The apparatus of claim 41, wherein the means for interpolating the second set of prediction samples comprises means for applying one or more filters in a vertical direction to the first set of prediction samples and the set of top edge neighboring samples.

43. The apparatus of claim 42, wherein the means for applying the one or more filters in the vertical direction includes means for using samples of the set of top edge neighboring samples to perform linear interpolation in the vertical direction.

44. The apparatus of claim 42, wherein the means for applying the one or more filters in the vertical direction comprises means for applying position dependent weights to at least some of the N samples of the set of top edge neighboring samples.

45. The apparatus of claim 36, wherein the means for decoding the current block of video data based on the final prediction block comprises:
   means for determining residual values for the current block of video data;
   means for adding the residual values to the filtered prediction block to determine a reconstructed block for the current block of video data; and
   means for applying one or more filters to the reconstructed block to generate a decoded block of video data.

* * * * *